United States Patent [19]

Machida

[11] Patent Number: 5,511,189
[45] Date of Patent: Apr. 23, 1996

[54] DATA SORTING APPARATUS CAPABLE OF DETECTING COMPLETION OF DATA SORTING EARLY AND SORTING METHOD THEREFOR

[75] Inventor: Hirohisa Machida, Hyogo, Japan

[73] Assignee: Mitsubishi Denki Kabushiki Kaisha, Tokyo, Japan

[21] Appl. No.: 310,745

[22] Filed: Sep. 22, 1994

Related U.S. Application Data

[63] Continuation of Ser. No. 842,031, Feb. 26, 1992, abandoned.

[30] Foreign Application Priority Data

Apr. 4, 1991 [JP] Japan ..................................... 3-071801
Dec. 4, 1991 [JP] Japan ..................................... 3-319470

[51] Int. Cl.$^6$ ..................................................... G06F 7/24
[52] U.S. Cl. ................... 395/600; 364/222.9; 364/962.3; 364/DIG. 1; 395/800; 340/146.2
[58] Field of Search .................................. 395/600, 800; 364/222.9, 962.3; 340/146.2

[56] References Cited

U.S. PATENT DOCUMENTS

| | | | |
|---|---|---|---|
| 4,078,260 | 3/1978 | Chen et al. | 395/800 |
| 4,210,961 | 7/1980 | Whitlow et al. | 395/600 |
| 4,520,456 | 5/1985 | Miranker et al. | 395/800 |
| 4,567,572 | 1/1986 | Morris et al. | 395/800 |
| 4,809,158 | 2/1989 | McCauley | 395/600 |
| 5,111,465 | 5/1992 | Eden et al. | 371/54 |
| 5,175,857 | 12/1992 | Inoue | 395/800 |
| 5,179,717 | 1/1993 | Sato et al. | 395/800 |
| 5,218,700 | 6/1993 | Beechick | 395/700 |
| 5,247,688 | 9/1993 | Ishigami | 395/800 |

FOREIGN PATENT DOCUMENTS

2342660A1  3/1975  Germany.
3344141T1  5/1984  Germany.

OTHER PUBLICATIONS

Baudet et al., "Supercomputing with VLSI: Sorting", IEEE International Conference on Computer Design Proceedings, 1987, pp. 8–11.

A. W. Maholick et al., Sorting Network, IBM Technical Disclosure Bulletin, vol. 12 No. 4, Sep. 1969 pp. 620–622.

Fast Sort of Ordered, or Partially Ordered, Data, IBM Technical Disclosure Bulletin, vol. 32 No. 1, Jun. 1989 pp. 248–249.

Simplified Odd–Even Sort Using Multiple Shift–Register Loops, International Journal of Computer and Information Sciences, vol. 7, No. 3, 1978, pp. 295–314.

B. Shirazi, A Parallel Exchange Sort Algorithm, 8th Annual Inter. Phoenix Conf. on Computers and Communications, 1989 IEEE Comput. Soc. Press pp. 366–370.

"An On–Chip Compare/Steer Bubble Sorter", D. T. Lee, Hsu Chang, and C. K. Wong, IEEE Transactions Computers, vol. C–30, No. 6, Jun. 1981, pp. 396–405.

*Primary Examiner*—Parshotam S. Lall
*Assistant Examiner*—Kenneth R. Coulter
*Attorney, Agent, or Firm*—Lowe, Price, LeBlanc & Becker

[57] ABSTRACT

Disclosed is a sorting apparatus for sorting applied n data. Data to be sorted are once held within data registers. Odd-numbered comparison/exchange circuits and even-numbered comparison/exchange circuits are alternately enabled, so that two data held between adjacent two data registers are compared/exchanged. Comparison/exchange circuits apply signals indicating data exchange to a sorting completion detecting circuit. Since sorting completion detecting circuit detects completion of sorting in response to the applied exchange signal, an operation after the completion of sorting is stopped. That is, a processing in the sorting apparatus ends in a short time.

13 Claims, 22 Drawing Sheets

DATA SORTING APPARATUS CAPABLE OF DETECTING COMPLETION OF DATA SORTING EARLY AND SORTING METHOD THEREFOR

This application is a continuation of application Ser. No. 07/842,031, filed Feb. 26, 1992, now abandoned.

BACKGROUND OF THE INVENTION

1. Field of the Invention

The present invention relates generally to data sorting apparatus and sorting methods and, more particularly, to a data sorting apparatus for sorting a large number of applied data in predetermined order in a short time and to a sorting method therefor. The invention has a particular applicability to sorting processors applicable to computer systems.

2. Description of the Background Art

In a computer system, in general, a processing for rearranging a large number of applied data in a predetermined order, e.g., in descending order or ascending order of values of data, i.e., a sorting processing is often carried out. Since the sorting processing is a fundamental processing in the computer system, various application programs for the sorting processing have conventionally been developed and widely used. Thus, studies for achieving a faster sorting processing were commenced at approximately the same time as the birth of computer systems and have been continued. A conventional sorting processing which has been known mainly employs algorithms, and hence, the processing is carried out on the basis of software, i.e., software for carrying out sorting.

A proposal for carrying out sorting processing by using hardware is also known. That is, machines dedicated for carrying out sorting processing, called sorters, integrated circuit devices dedicated for sorting processing, called sorting processors, and the like have conventionally been developed. However, a sorting processor that has a sufficient performance and is able to process a large amount of data at a high speed has not yet been developed irrespective of its great demand.

FIG. 9 is a circuit block diagram of a conventional sorting apparatus employing hardware. This sorting apparatus is disclosed in Japanese Patent Publication No. 61-2211. With reference to FIG. 9, the sorting apparatus includes n cell circuits 11–1n each including a register for holding data of 32 bits. n data to be sorted are first held in n cell circuits 11–1n, respectively. Two adjacent circuits of n cell circuits 11–1n are connected with each other, so that two data can be exchanged between the circuits in response to the result of comparison between the two compared data. Respective cell circuits 11–1n are connected to receive a sorting start signal 3a, an initial state setting signal 3b and a clock signal 3c having a predetermined frequency. Odd-numbered cell circuits 11, 13, . . . of cell circuits 11–1n are connected to receive a designation signal 3d, while even-numbered cell circuits 12, 14, . . . are connected to receive a designation signal 3e. A control signal generating unit 2 applies or receives various control signals and data to or from an external apparatus, to generate control signals 3a, 3b, 3c, 3d and 3e for controlling cell circuits 11–1n.

In operation, all cell circuits 11–1n are reset in response to initial state setting signal 3b generated from control signal generating unit 2. Then, n data to be sorted are held in n registers (not shown) provided in cell circuits 11–1n, respectively. After control signal generating unit 2 generates sorting start signal 3a, n cell circuits 11–1n respond to clock signal 3c to carry out the following sorting operation. A description will now be given on an example in which the applied n data are rearranged in ascending order by sorting.

The sorting operation is carried out by repetition of first and second operation steps. In the first step, a comparison is made between data in each of the odd cell circuits and that in each of the even cell circuits located over the odd cell circuits. When data in each even cell circuit is smaller than that in each odd cell circuit, the two data are exchanged therebetween. The above-described comparison processing and exchange processing are carried out at a time between any adjacent odd and even cell circuits. In the second step, a comparison is made between data held in each even cell circuit and that held in each odd cell circuit located over the even cell circuit. When the data in the odd cell circuit is smaller than that in the even cell circuit, the held data are exchanged between those two cell circuits. Accordingly, repetition of the first and second operation steps by (n−1) times results in the end of the sorting of the applied n data. It is pointed out that the comparison and exchange operation that is required until the sorting processing is completed is determined depending on the number of data to be sorted. That is, when n data are applied, it is necessary to repeat the comparison and exchange operation by (n−1) times, i.e., approximately n times. This means that the time required for the sorting processing is increased in proportion to the number of data to be sorted.

Accordingly, when 10,000 data to be sorted are applied, for example, the comparison and exchange operation is repeated by 9999 times, i.e., approximately 10000 times. However, depending on the order of data to be initially applied, it is sometimes unnecessary to inevitably repeat the comparison and exchange operation by approximately 10,000 times. More specifically, depending on the order of data to be initially applied, there is a case where applied data are arranged in a desired order by repetition of the comparison and exchange operation by e.g., 5000 times. In the conventional sorting apparatus shown in FIG. 9, since the data comparison and exchange operation is necessarily repeated by approximately 10000 times even in such a case, the time required for processing is increased by carrying out unnecessary processings. That is to say, in the conventional sorting apparatus, in order to carry out the sorting processing, a fixed time that is determined depending on the number of data to be sorted is required, thereby preventing the sorting processing from being carried out in a short time. It is pointed out in general that the sorting processing is completed by repeating the data comparison and exchange operation by a number less than the number of applied data.

SUMMARY OF THE INVENTION

One object of the present invention is to provide a sorting apparatus and a sorting method in which a sorting processing of a plurality of applied data can finish in a shorter time.

According to one aspect, a sorting apparatus in accordance with the present invention includes: n data holding circuits for holding applied n data to be sorted in a predetermined order; a first pair selecting circuit for selecting a group of first pairs, each pair including predetermined adjacent two data holding circuits of the n data holding circuits; first comparison circuits responsive to the first pair selecting circuit for comparing two data held in a pair of the two holding circuits for each selected pair; first data exchange circuits responsive to the first comparison circuits for exchanging the held data between the two paired holding circuits for each selected pair; a second pair selecting circuit for selecting a group of second pairs, each pair including predetermined other adjacent two data holding circuits of the n data holding circuits, which are not selected by the first pair selecting circuit; second comparison circuits responsive to the second pair selecting circuit for comparing two data held in the paired two data holding circuits for each selected pair; second data exchange circuits responsive to the second comparison circuits for exchanging the held data between the paired two data holding circuits for each selected pair; and a sorting completion detecting circuit responsive to the first and second comparison circuits for detecting completion of sorting of the applied n data.

In operation, since the sorting completion detecting circuit detects completion of sorting of the applied n data in response to the results of comparison by the first and second comparison circuits, it is possible to detect that the applied n data are already arranged in predetermined order immediately after the sorting is completed. In other words, since the completion of the sorting can be detected, sorted data are obtained in a short time without repetition of the comparison and exchange processing by a fixed number.

According to another aspect of the present invention, a data sorting method includes the steps of: selecting a group of first pairs, each pair including predetermined adjacent two data holding circuits of n data holding circuits for holding n data to be sorted; comparing two data held in the paired two data holding circuits for each selected pair, to obtain a first comparison result; exchanging the held data between the paired two data holding circuits for each selected pair in response to the first comparison result; selecting a group of second pairs, each pair including predetermined other adjacent two data holding circuits of the n data holding circuits which are not selected in the first pair selecting step; comparing two data held in-the paired two data holding circuits for each pair selected in the second pair selecting step, to obtain a second comparison result; exchanging the held data between the paired two data holding circuits for each selected pair in response to the second comparison result; and detecting completion of sorting of the n data in response to the first and second comparison results.

According to still another aspect of the present invention, a data sorting apparatus includes: a sorting circuit for sorting applied n data in predetermined order; a data dividing circuit for dividing all data to be sorted into L data groups, each group having n data or less; and a data applying circuit for applying the data divided by the data dividing circuit to the sorting circuit in units of data groups. The sorting circuit sorts applied data in units of data groups with respect to n data groups. The sorting circuit further includes: a data extracting circuit for extracting optimum data in the order predetermined in each group from each of L data groups sorted by the sorting circuit; and an optimum data determining circuit for determining optimum data in predetermined order from the data extracted by the data extracting circuit. The data sorting circuit is implemented by a sorting apparatus in accordance with claim 1 of the present invention.

According to still another aspect of the present invention, a data sorting apparatus includes: a sorting circuit for sorting applied data in predetermined order; and a higher order bit data applying circuit for applying higher order bit data of each of n data to be sorted to the sorting circuit. The sorting circuit carries out a sorting for the applied n higher order bit data. The sorting apparatus further includes: a matching data group detecting circuit for detecting a matching data group including matching data from the higher order bit data processed by the sorting circuit; and a lower order bit data applying circuit for applying lower order bit data corresponding to the higher order bit data in the matching data group to the sorting circuit. The sorting circuit carries out a sorting for the applied lower order bit data. The sorting apparatus further includes an order determining circuit for determining the order of n data in accordance with the result of processing the higher order bit data and the lower order bit data by the sorting circuit. The sorting circuit is implemented by the sorting apparatus according to claim 1 of the present invention.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
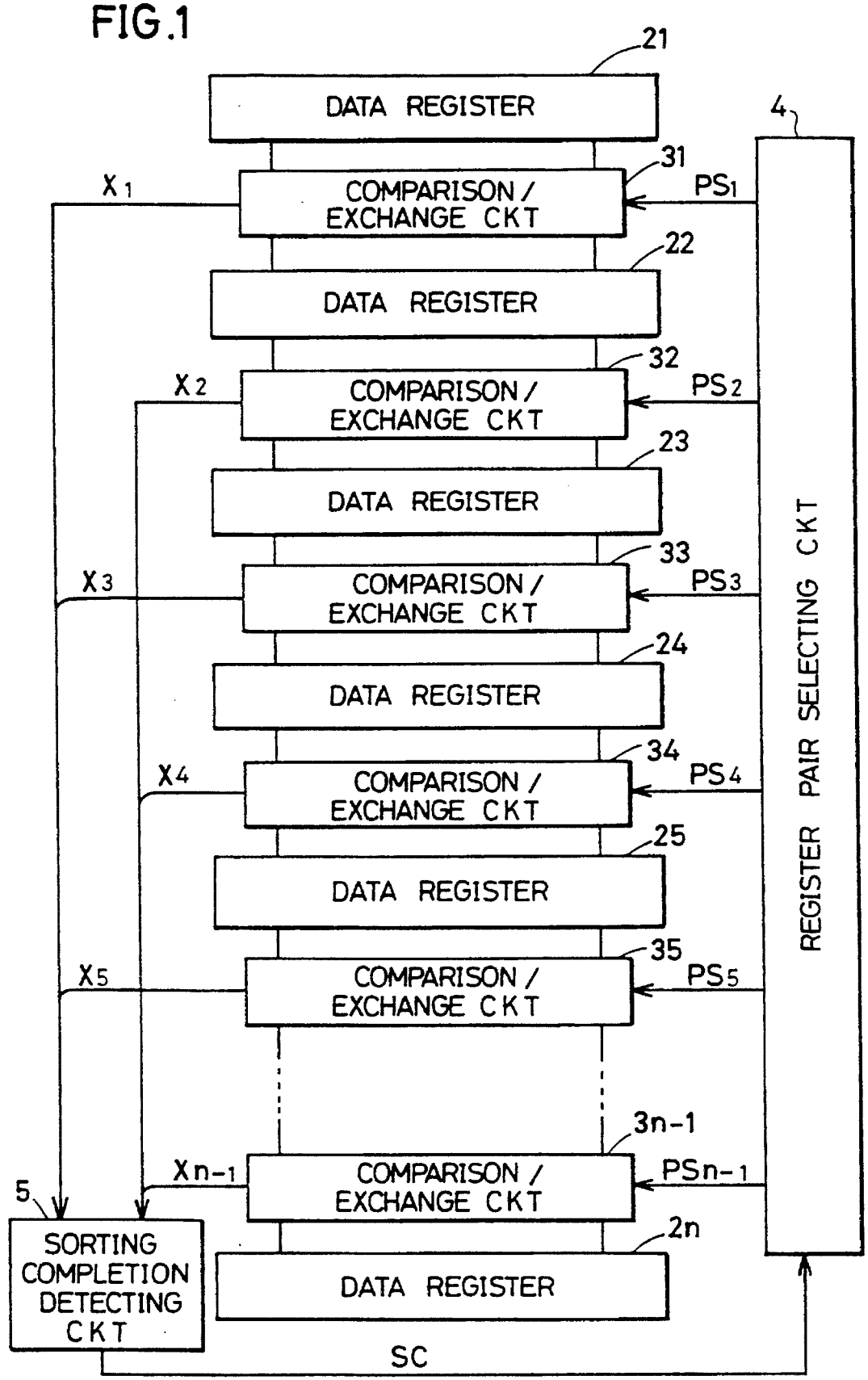
FIG. 1 is a block diagram of a sorting apparatus showing one embodiment of the present invention.

FIG. 1 is a block diagram of a sorting apparatus showing one embodiment of the present invention. A description will now be made on one example of concepts of the present invention by reference to the sorting apparatus of FIG. 1. This sorting apparatus comprises n data registers 21-2n for holding n data to be sorted, respectively, comparison/exchange circuits $31-3_{n-1}$ connected between adjacent data registers, a register pair selecting circuit 4 for selectively enabling any of odd-numbered comparison/exchange circuits 31, 33, ... and even-numbered comparison/exchange circuits 32, 34, ... , and a sorting completion detecting circuit 5 for detecting completion of sorting in response to output signals FL1 and FL2 generated from comparison/exchange circuits $31-3_{n-1}$.

Figure 2:
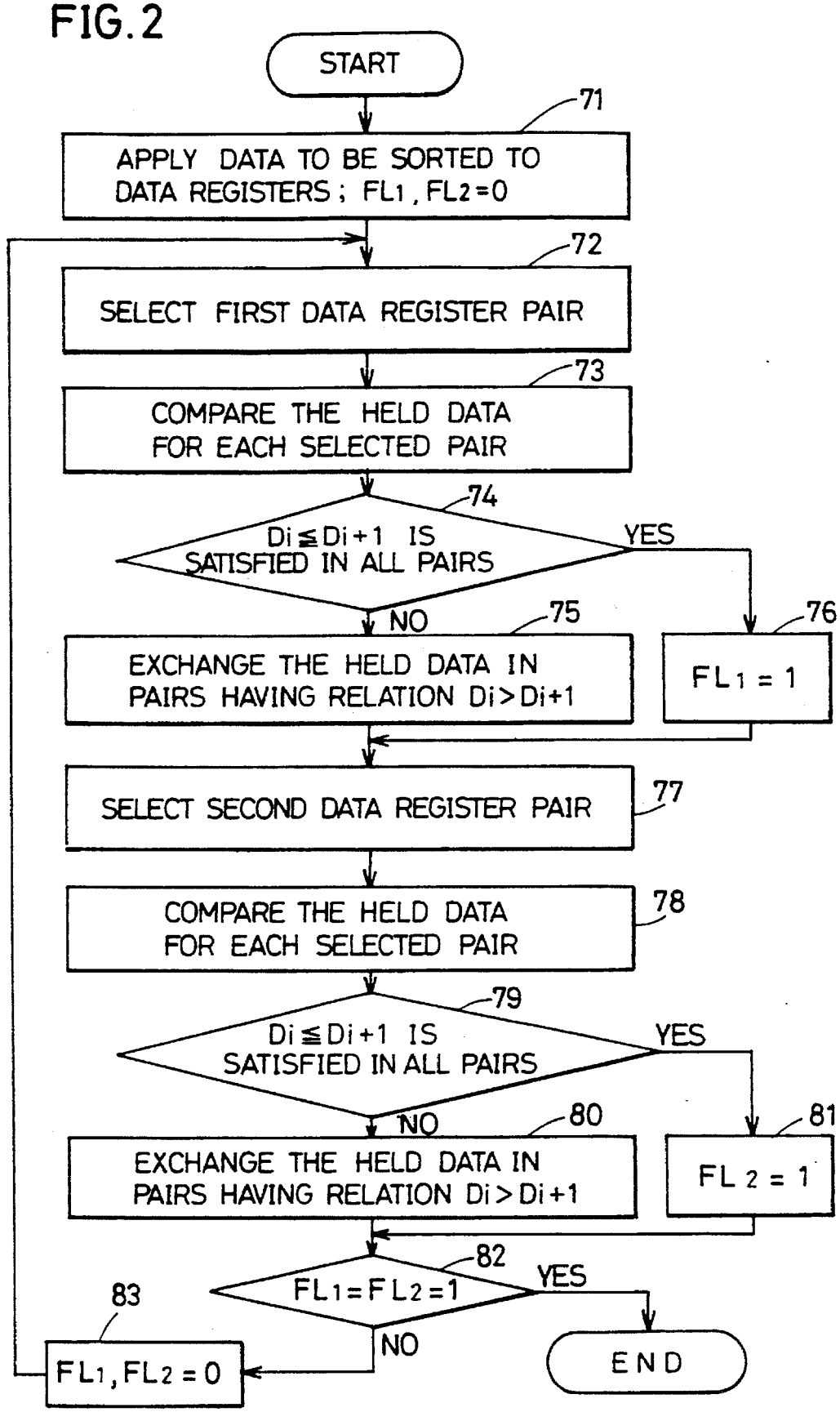
FIG. 2 is a flow chart for use in explaining an operation of the sorting apparatus shown in FIG. 1.

FIG. 2 is a flow chart for use in explaining an operation of the sorting apparatus shown in FIG. 1. A description will now be given on the operation of the sorting apparatus of FIG. 1 with reference to FIG. 2. The following description is made on an example in which applied n data are rearranged in ascending order by sorting. First, in step 71, n data to be sorted are applied to and held in data registers 21-2n. In addition, flag signals FL1 and FL2 are reset (=0). Then, in step 72, register pair selecting circuit 4 selects "first data register pairs." The "first data register pairs" are determined by combinations of the upper odd data registers and the lower even data registers. Thus, register pair selecting circuit 4 generates pair selecting signals PS1, PS3, PS5 ... for enabling odd comparison/exchange circuits 31, 33, 35 ... Odd comparison/exchange circuits 31, 33, 35 ... are enabled in response to signals PS1, PS3, PS5 ... , so that the following comparison/exchange processing is carried out.

In step 73, the held data are compared for each selected data register pair. For example, comparison/exchange circuit 31 compares data held in data register 21 and that in data register 22. A similar comparison operation is carried out at a time in all odd comparison/exchange circuits 31, 33, 35 ..., in which the data held in the respective data register pairs are compared with each other.

A determination is made in step 74 as to whether a relationship $D_i \leq D_{i+1}$ is satisfied for each compared data pair. Data $D_i$ represents data held in the upper data registers, i.e., the odd data registers in this operation, and $D_{i+1}$ represents data held in the lower data registers, i.e., the even data registers. For example, comparison/exchange circuit 31 makes a comparison between data $D_{21}$ held in data register 21 and data $D_{22}$ held in data register 22. When the relation $D_i \leq D_{i+1}$ is satisfied in all the data pairs compared in step 74, a flag signal is set (=1) in step 76.

The held data are exchanged in the data pairs having a relation $D_i > D_{i+1}$, in step 75. On the other hand, the held data are not exchanged in the data pairs having the relation $D_i \leq D_{i+1}$. Consequently, smaller data is held in the upper data register, while larger data is held in the lower data register in each selected data register pair.

Second data register pairs are selected in step 77. The second data register pairs are determined by combinations of upper even data registers and lower odd data registers. Thus, register pair selecting circuit 4 generates pair selection signals PS2, PS4 ... for enabling even comparison/exchange circuits 32, 34 ... Comparison/exchange circuits 32, 34 ... are enabled in response to signals PS2, PS4, ... For example, comparison/exchange circuit 32 is enabled in response to pair selection signal PS2.

The held data are compared for each selected data register pair in step 78. For example, comparison/exchange circuit 32 is enabled in response to pair selection signal PS2, so as to compare data $D_{22}$ held in data register 22 with data $D_{23}$ held in data register 23.

A determination is made in step 79 as to whether the relation $D_i \leq D_{i+1}$ is satisfied in all the selected data pairs. When this relation is satisfied, flag signal FL2 is set (=1) in step 81.

In step 80, the held data are exchanged between the selected data register pairs in the data pairs having the relation $D_i > D_{i+1}$. On the other hand, no data exchange is made in the data pairs having the relation $D_i \leq D_{i+1}$.

A determination is made in step 82 as to whether both flag signals FL1 and FL2 are set (=1). The state where flag signals FL1 and FL2 are set means that no data exchange is made between the data pairs in steps 75 and 80. That is, since the applied n data are already arranged in ascending order in data registers 21-2n, a sorting operation is completed without repetition of the foregoing processing.

In contrast, when at least one of flag signals FL1 and FL2 remains reset (=0), both flag signals FL1 and FL2 are reset in step 83. Further, the processing returns to step 72, from which the same operation as above is repeated.

Comparison/exchange circuits $31-3_{n-1}$ shown in FIG. 1 generate exchange signals $X1-X_{n-1}$ when exchanges are made based on the respective results of comparison. Sorting completion detecting circuit 5 responds to exchange signals $X1-X_{n-1}$ to detect completion of sorting. That is, sorting completion detecting circuit 5 receives signals $X1-X_{n-1}$ indicating that no exchange is made in any comparison/exchange circuits $31-3_{n-1}$, so as to detect that the applied n data are sorted. Thus, circuit 5 applies a sorting completion signal SC to register pair selecting circuit 4, so that the operation of circuit 4 is stopped. It is pointed out that flag signals FL1 and FL2 used in the flow chart of FIG. 2 are handled in the processing within sorting completion detecting circuit 5.

Figure 3:
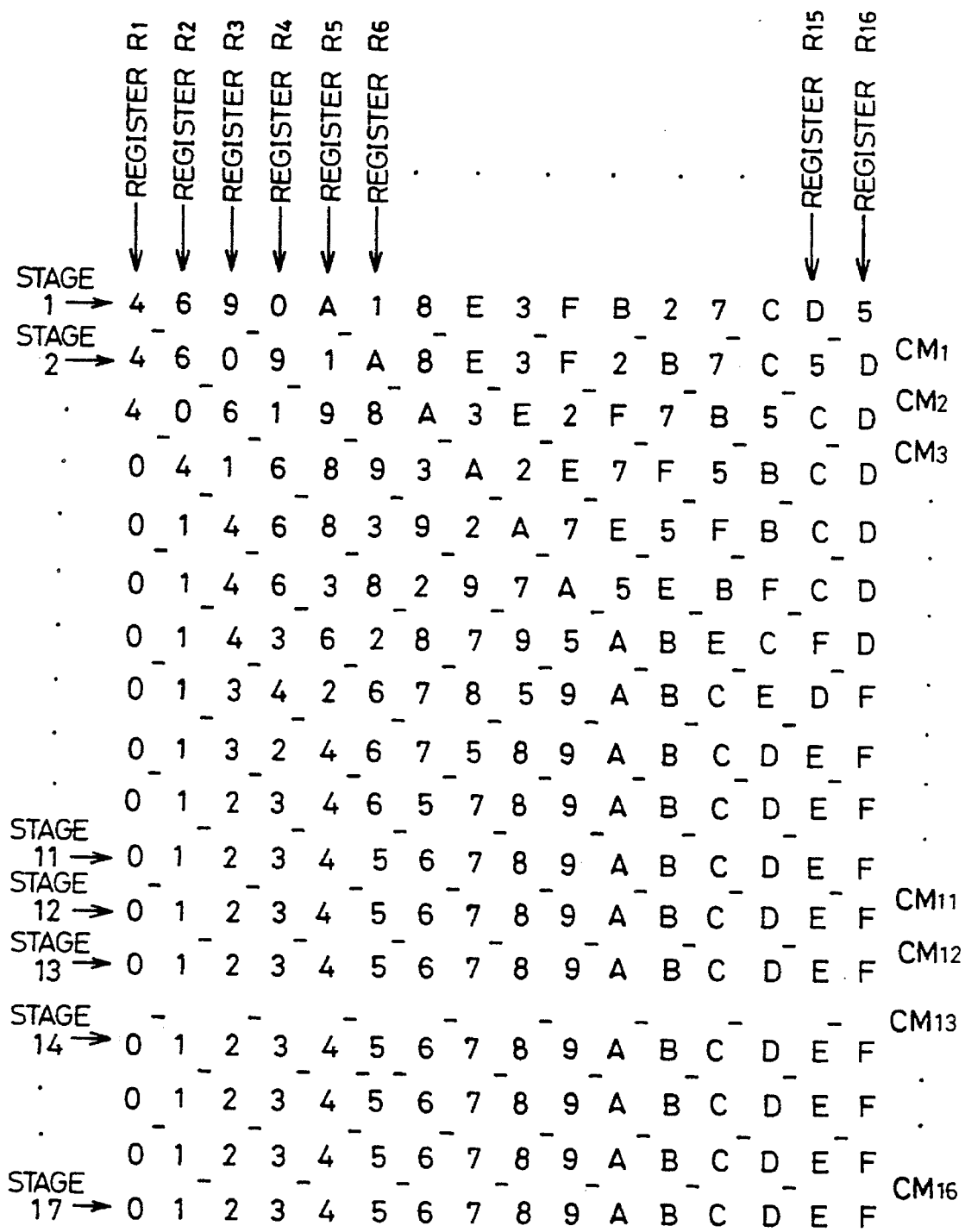
FIG. 3 is a data transition diagram showing one example of a processing in the sorting apparatus of FIG. 1.

FIG. 3 is a data transition diagram showing one example of processings in the sorting apparatus of FIG. 1. With reference to FIG. 3, assume that 16 hexadecimal data "0, 1, 2, ... E, F" to be sorted are applied in this example. Thus, 16 data registers and 15 comparison/exchange circuits are employed in the sorting apparatus of FIG. 1. 16 data to be sorted are respectively held in registers R1–R16 in the order shown at a stage 1 of FIG. 3.

In a first comparison/exchange processing CM1, the held data are compared/exchanged for each register pair R1 and R2, R3 and R4, ... R15 and R16. For example, respective data "9" and "0" held in respective registers R3 and R4 are exchanged. Similarly, respective data "A" and "1" held in respective registers R5 and R6 are exchanged. As a result, data shown at a stage 2 are held in registers R1–R16.

In the next comparison/exchange processing CM2, data are compared/exchanged in each register pair R2 and R3, R4 and R5, ... By repetition of the comparison/exchange processing, sorted data are provided in registers R1–R15 at a stage 11.

After stage 11, comparison/exchange processings CM11 and CM12 are carried out, so that flag signals FL1 and FL2 are set (=1). Thus, the completion of sorting is detected (at a stage 13).

Figure 9:
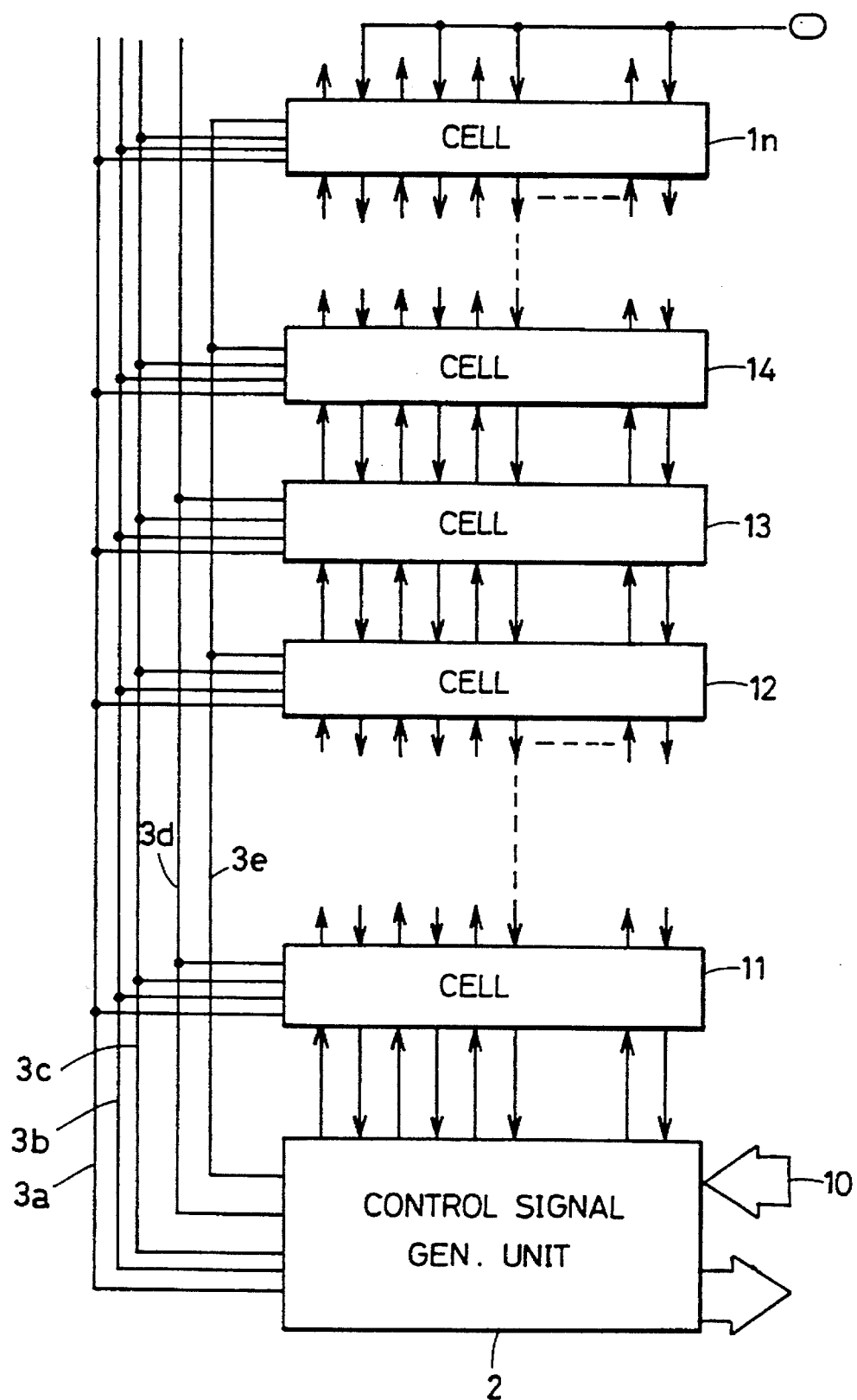
FIG. 9 is a circuit block diagram of a conventional sorting apparatus.

Accordingly, comparison/exchange processings CM13–CM16 are not carried out. Although comparison/exchange processings CM13–CM16 are unnecessary processings as understood from FIG. 3, such processings are carried out in the conventional sorting apparatus of FIG. 9.

This is because the number of comparison/exchange processings in the conventional sorting apparatus is determined by the number of data to be sorted, as described above. Accordingly, the use of the sorting apparatus of FIG. 1 prevents comparison/exchange processings CM13–CM16 shown in FIG. 3, so that the sorting ends in a short time. More precisely, the completion of sorting can be detected at an earlier stage.

Figure 4:
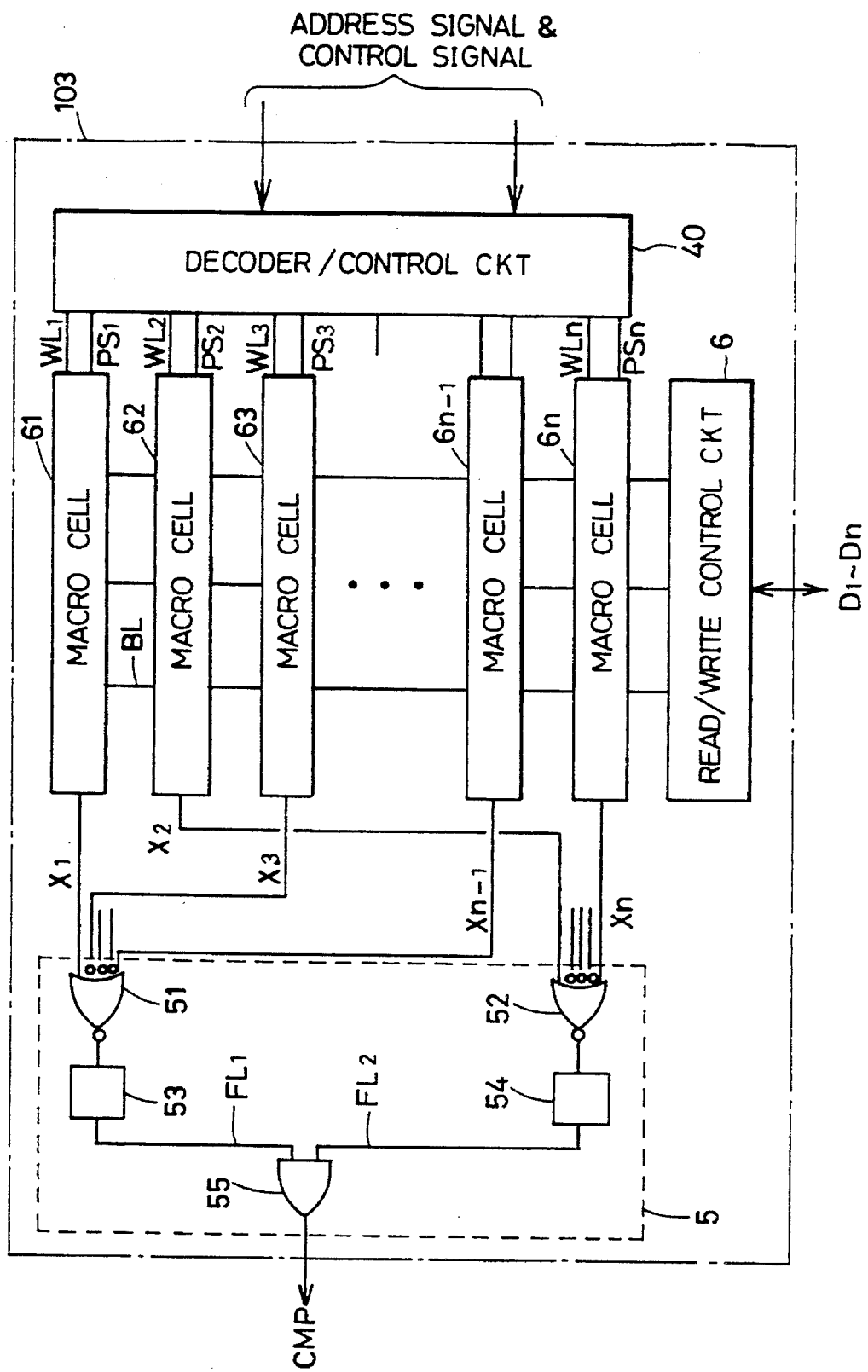
FIG. 4 is a block diagram of a sorting processor showing another embodiment of the present invention.
Figure 8:
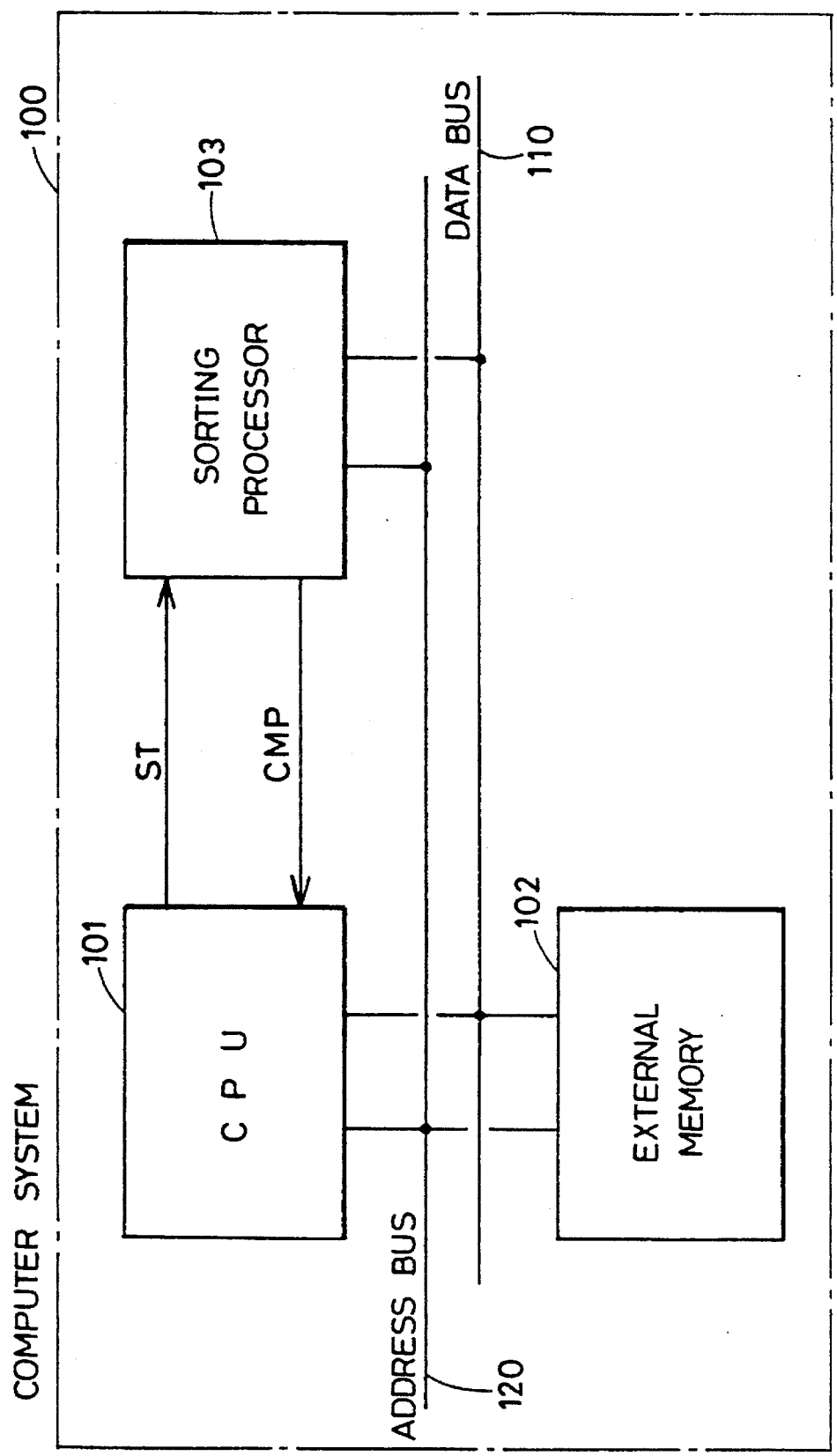
FIG. 8 is a block diagram of a computer system that can employ the sorting processor of the one embodiment of the present invention.

FIG. 4 is a block diagram of a sorting processor showing another embodiment of the present invention. This sorting processor 103 is employed in, for example, a computer system 100 shown in FIG. 8. With reference to FIG. 8, computer system 100 includes a central processing unit (CPU) 101, an external memory 102 and sorting processor 103. Those three apparatuses 101,102 and 103 are connected through a data bus 110 and an address bus 120.

In operation, when data stored in external memory 102 is to be sorted, external memory 102 responds to a control signal generated from CPU 101 to apply the data to be sorted via data bus 110 to sorting processor 103. After the applied data is held in sorting processor 103, CPU 101 applies a sorting start signal ST to sorting processor 103. Thus, after a sorting processing is commenced in sorting processor 103 and then the sorting is completed, a sorting completion signal CMP is applied from sorting processor 103 to CPU 101. CPU 101 responds to sorting completion signal CMP to start other processings by using sorted data.

With reference to FIG. 4, sorting processor 103 includes: n macro cells 61–6n each including a circuit for holding and comparing/exchanging data to be sorted; a decoder/control circuit 40 for controlling macro cell circuits 61–6n in response to an applied address signal and control signal; a read/write control circuit 6 for inputting and outputting data $D_1$–$D_n$ to be sorted; and a sorting completion detecting circuit 5 for detecting completion of sorting in response to exchange signals X1–Xn generated from macro cells 61–6n. Sorting completion detecting circuit 5 includes a NOR gate 51 connected to receive exchange signals X1, X3, . . . output from odd macro cells 61, 63, . . . ; a NOR gate 52 connected to receive exchange signals X2, X4, . . . output from even macro cells 62, 64, . . . ; latch circuits 53 and 54 for latching flag signals FL1 and FL2 output from NOR gates 51 and 52, respectively; and an AND gate 55 connected to outputs of latch circuits 53 and 54. A single macro cell includes a circuit for sorting in a single data register and a single comparison/exchange circuit shown in FIG. 1. Since each data to be sorted is expressed by a plurality of data bits, macro cells 61–6n are connected through a plurality of bit lines BL. Internal circuits in the macro cells will be described in detail later.

In operation, decoder/control circuit 40 responds to an applied address signal to sequentially select word lines WL1–WLn, so that n data to be sorted are written via bit lines BL into the data register circuits in macro cells 61–6n. After data $D_1$–$D_n$ to be sorted are held in macro cells 61–6n, the above-described comparison/exchange operation is repeated. That is, since decoder/control circuit 40 responds to an applied control signal to generate pair selection signals PS1–PSn, respective comparison/exchange circuits (not shown) provided within respective macro cells 61–6n are selectively enabled. More specifically, like the case with the sorting apparatus shown in FIG. 1, the odd comparison/exchange circuits and the even comparison/exchange circuits are alternately enabled in response to pair selection signals PS1–PSn. The foregoing comparison/exchanging processing is repeated between n macro cells 61–6n, so that signals X1–Xn indicating that an exchange is made between any compared two data are generated from macro cells 61–6n, respectively.

NOR gate 51 provided within sorting completion detecting circuit 5 receives exchange signals X1, X3, . . . generated from the odd comparison/exchange circuits. When there is no data exchange in all the odd comparison/exchange circuits, NOR gate 51 outputs a flag signal of "1", so that latch circuit 53 latches the applied signal FL1. NOR gate 52 receives exchange signals X2, X4, . . . generated from the even comparison/exchange circuits. When there is no data exchange in all the even comparison/exchange circuits, NOR gate 52 outputs a flag signal FL2 of "1", so that latch circuit 54 latches the applied signal FL2. Thus, AND gate 55 responds to latched flag signals FL1 and FL2 to output a sorting completion signal CMP of "1".

Figure 5:
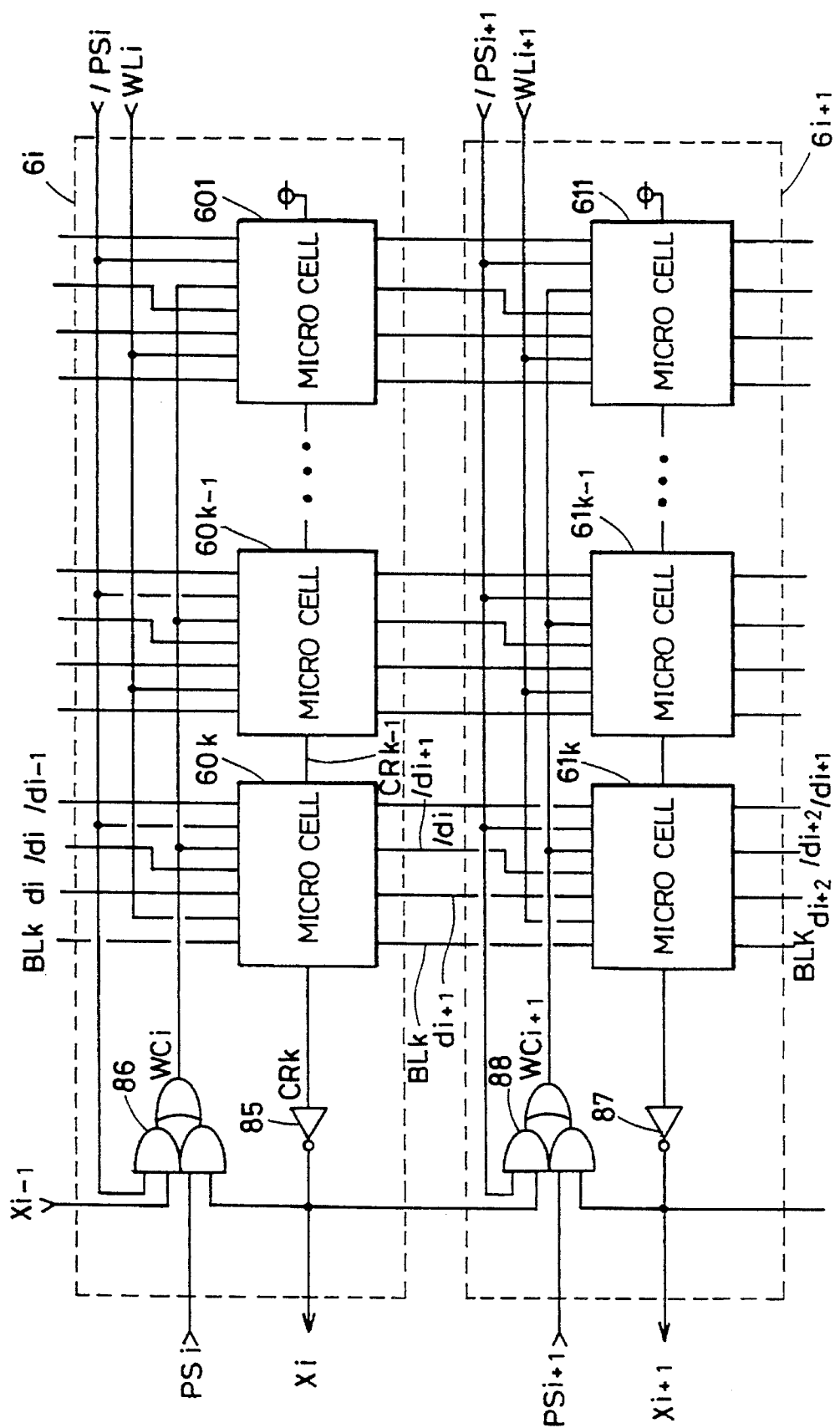
FIG. 5 is a circuit diagram of two adjacent macro cells shown in FIG. 4.

FIG. 5 is a circuit diagram of adjacent two macro cells $6_i$ and $6_{i+1}$ shown in FIG. 4. With reference to FIG. 5, i-th macro cell 6i includes k micro cells 601–60k, an inverter 85, and a selector circuit 86. One micro cell 60k is connected to a corresponding micro cell (not shown) in a macro cell at a preceding stage and to a corresponding micro cell 61k in macro cell $6_{i+1}$ at a succeeding stage. Here, a signal $d_i$ represents a data bit held in corresponding micro cell 60k within the i-th macro cell, and a symbol /di represents an inversion signal of signal $d_i$. Similarly, a symbol $d_{i+1}$ represents a data bit held in a corresponding micro cell 61k within the (i+1)-th macro cell $6_{i+1}$. A bit line BLk for a k-th data bit is connected to corresponding k-th micro cells 60k, 61k . . . A signal $X_i$ indicates that there is data exchange in the i-th macro cell circuit 6i. A signal $PS_i$ indicates a pair selection signal to be applied to the i-th macro cell 6i, and a signal /$PS_i$ indicates an inversion signal of signal $PS_i$. A pair selection signal $PS_{i+1}$ is obtained by inversion of signal $PS_i$. Thus, one of macro cells $6_i$ and $6_{i+1}$ is alternately enabled in response to signals $PS_1$+$PS_{i+1}$.

Figure 6:
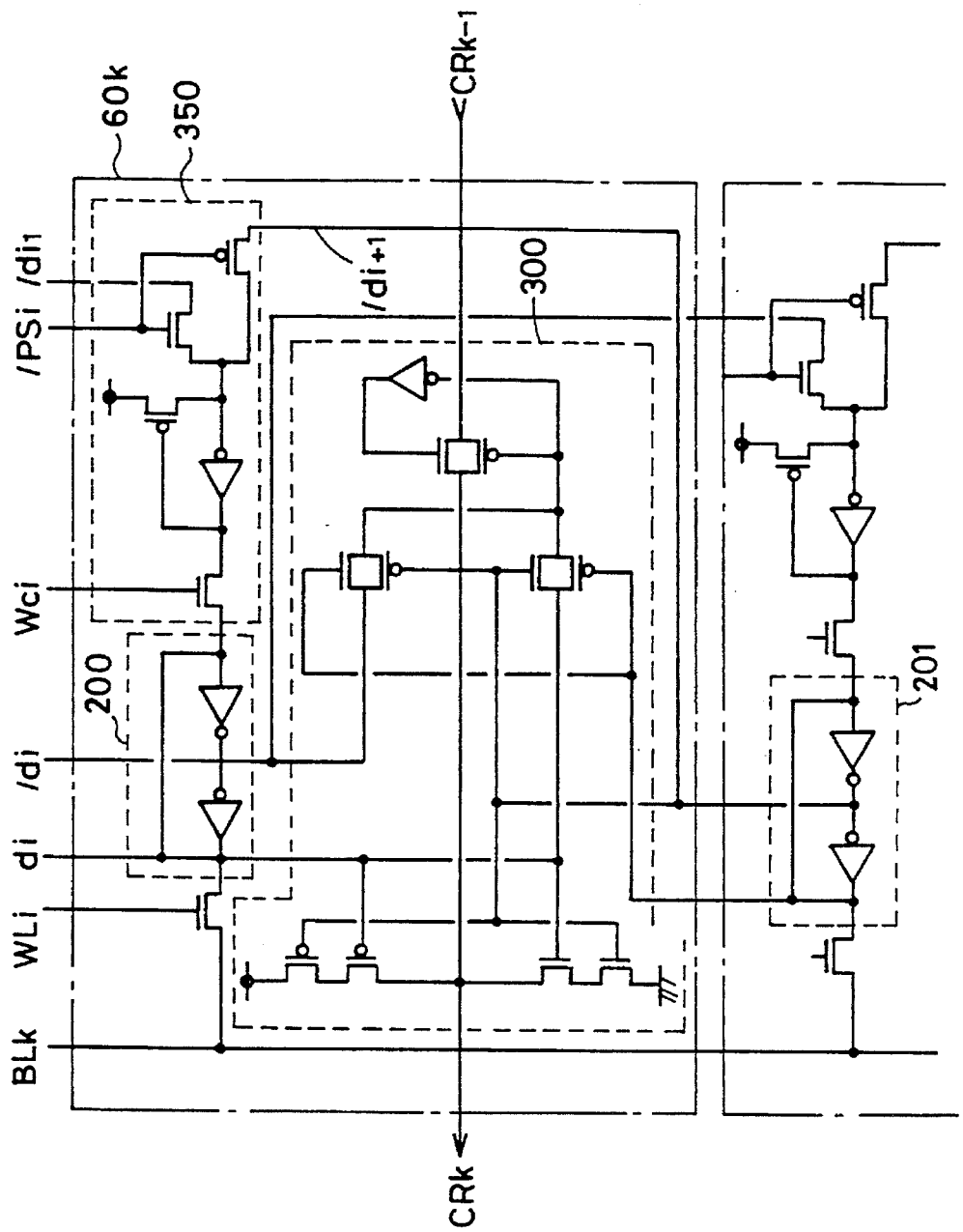
FIG. 6 is a circuit diagram of a single micro cell shown in FIG. 5.

FIG. 6 is a circuit diagram of a single micro cell 60k shown in FIG. 5. With reference to FIG. 6, this micro cell circuit 60k includes a data bit latch circuit 200 for latching one-bit data bit signals $d_i$ and/$d_i$ therein, a comparison circuit 300 for comparing the data bit signals latched in two latch circuits 200 and 201, and an exchange circuit 350 responsive to the result of comparison for exchanging the latched data bit signals between latch circuit 200 and its adjacent data bit latch circuit. Latch circuit 200 responds to a word line signal $WL_i$ to receive a data bit signal on bit line BLk and latch the same. When the compared two data bit signals match each other, comparison circuit 300 outputs as a signal CRk a comparison result signal $CR_{k-1}$ of a lower order data bit signal. Exchange circuit 350 is enabled in response to pair selection signal/$PS_i$ generated from decoder/control circuit 40 shown in FIG. 4. Thus, one of data bit signals/$d_{i-1}$ and/$d_{i+1}$ is selected, so that the selected data bit signal is applied to latch circuit 200 in response to a rewrite signal $WC_i$ generated from selector circuit 86 shown in FIG. 5. As a result, the data bit signal latched in latch circuit 200 is altered to the selected data bit signal.

Figure 7:
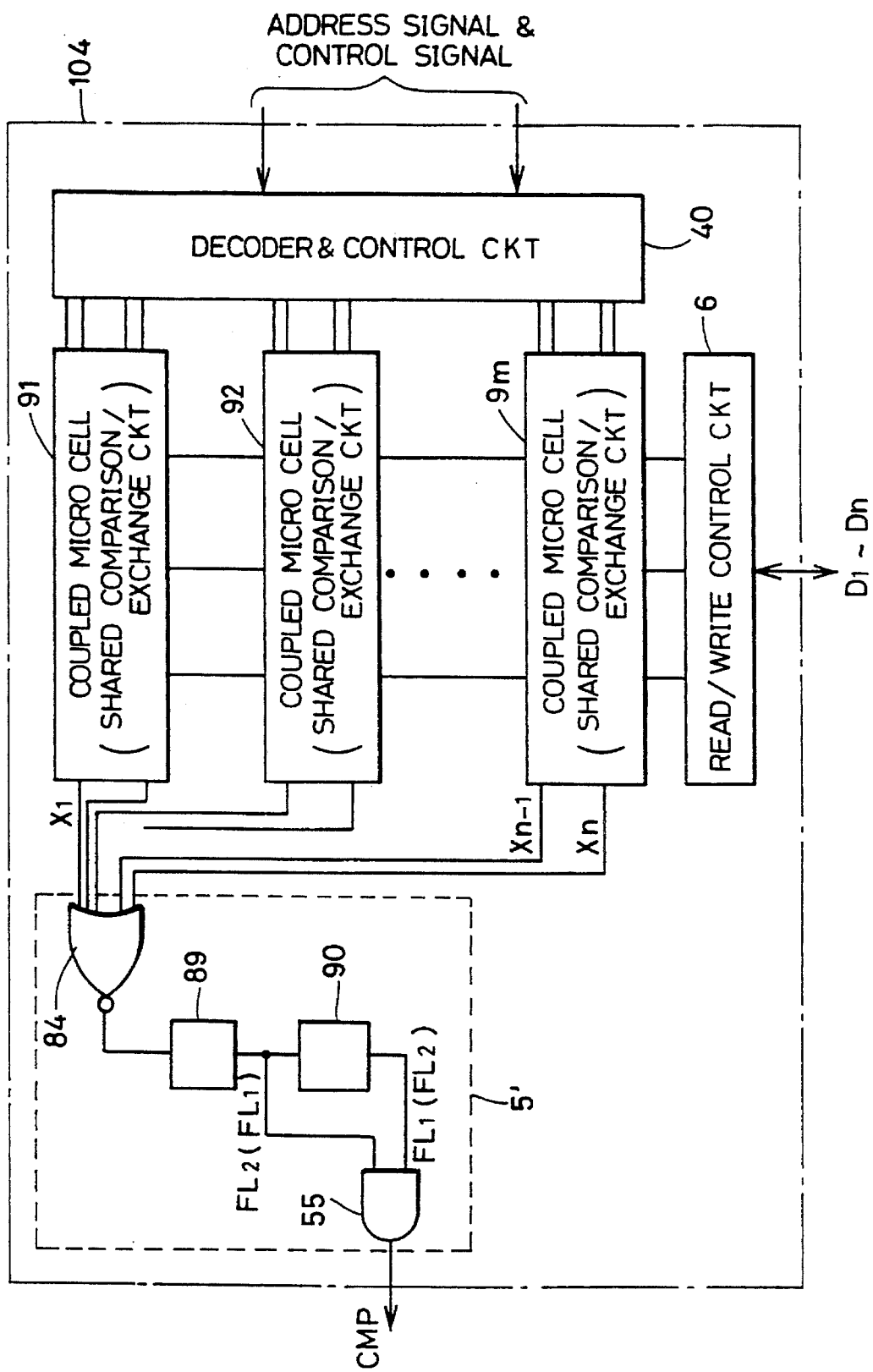
FIG. 7 is a block diagram of a sorting processor showing still another embodiment of the present invention.

FIG. 7 is a block diagram of a sorting processor showing still another embodiment of the present invention. With reference to FIG. 7, this sorting processor 104 includes coupled macro cells 91–9m each including two data registers and one shared comparison/exchange circuit therein, and another sorting completion detecting circuit 5'. While a comparison/exchange circuit is provided for each data register in each of macro cells 61–6n shown in FIG. 4, half the number of comparison/exchange circuits are alternately operated as can be understood from the foregoing explanation. This means that half of the comparison/exchange circuits that can always operate are enough. Accordingly, a constantly operable comparison/exchange circuit is shared by two data registers within a single coupled macro cell in sorting processor 104 shown in FIG. 7. As a result, when compared with sorting processor 103 shown in FIG. 4, sorting processor 104 provides higher integration density in a semiconductor integrated circuit since half of the comparison/exchange circuits are omitted.

In addition, sorting completion detecting circuit 5' includes a NOR gate 84 connected to receive exchange signals X1–Xn output from shared comparison/exchange circuits, two latch circuits 89 and 90 constituting a two-stage shift register, and an AND gate 55 for receiving latched signals. NOR gate 84 responds to exchange signals X1–Xn output from the shared comparison/exchange circuits to output flag signals FL1 and FL2 alternately. Latch circuits 89 and 90 alternately latch output flag signals FL1 and FL2. Thus, when flag signals FL1 and FL2 of "1" are latched in latch circuits 89 and 90, AND gate 55 generates a sorting completion signal CMP indicating completion of sorting.

Since the operation of sorting processor 104 shown in FIG. 7 is basically the same as that of sorting processor 103 shown in FIG. 4, a description thereof will not be repeated here. It is pointed out that sorting processor 104 shown in FIG. 7 is applicable in place of sorting processor 103, in a computer system 100 shown in FIG. 8.

As has been described heretofore, since a sorting completion detecting circuit for detecting the completion of sorting in response to exchange signals X1–Xn generated from the comparison/exchange circuits is provided in the sorting apparatus shown in FIG. 1 and in each of sorting processors 103 and 104 shown in FIGS. 4 and 7, the sorting completion detecting circuit can detect the completion of sorting immediately after applied data are sorted. This prevents continuation of the sorting operation in spite of the fact that the sorting is completed. In other words, the time required for the sorting apparatus or sorting processors to end the sorting processing is reduced.

A still further embodiment of the present invention will now be described in the following. In the following embodiment, a sorting apparatus or sorting processors which operate in the same manner as the sorting apparatus shown in FIG. 1 are employed.

Figure 10:
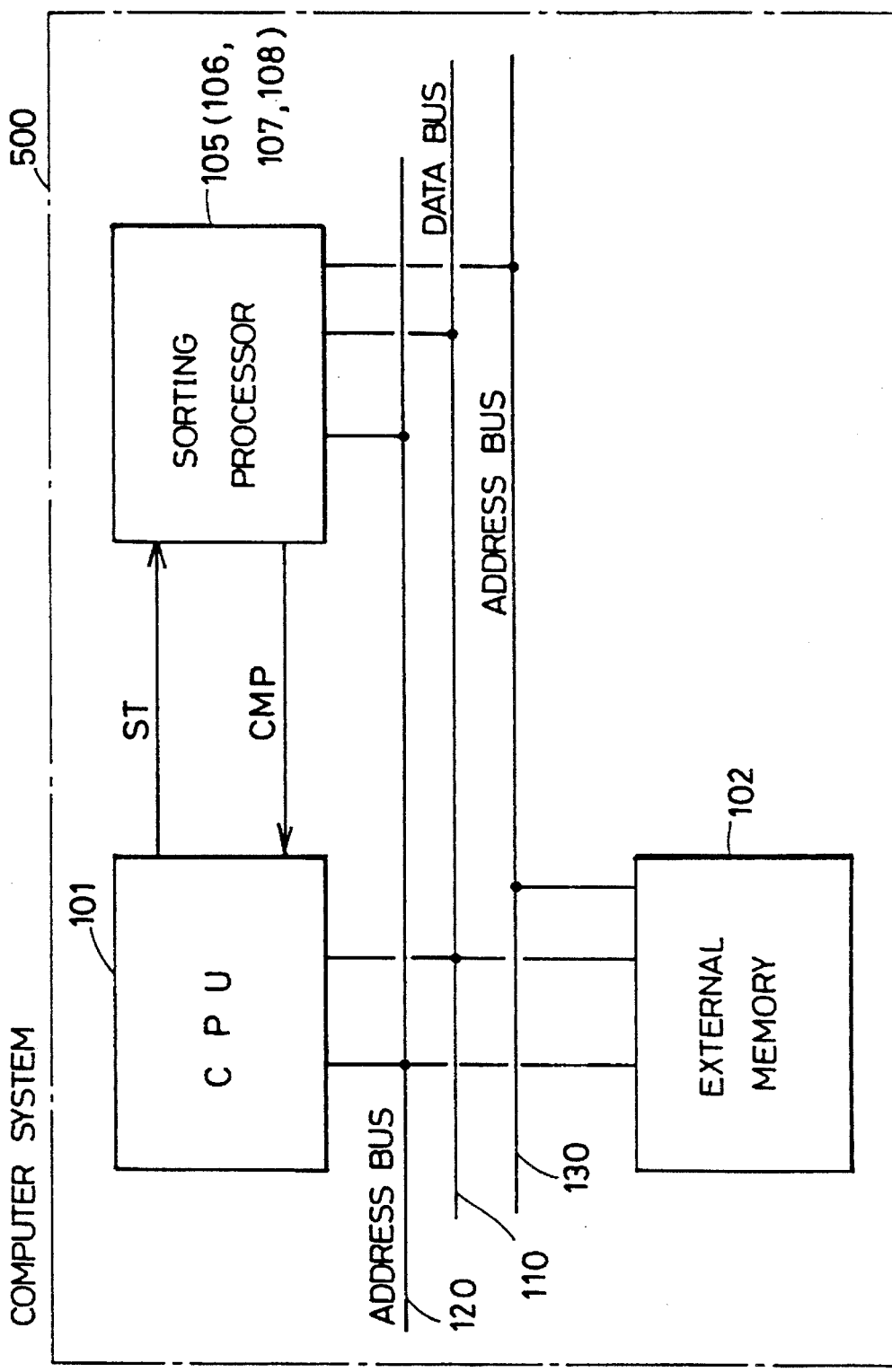
FIG. 10 is a block diagram of a computer system that can employ a sorting circuit or sorting processor of another embodiment of the present invention.

FIG. 10 shows an example of a computer system which can employ the sorting apparatus or sorting processor of the embodiment of the present invention. Referring to FIG. 10, a computer system 500 includes an additional address bus 103 as compared with computer system 100 shown in FIG. 8. Address bus 103 is provided to transmit addresses necessary in the following embodiment. Since the other structures in computer system 500 are the same as those in computer system 100 shown in FIG. 8, a description thereof will not be repeated here.

Figure 11:
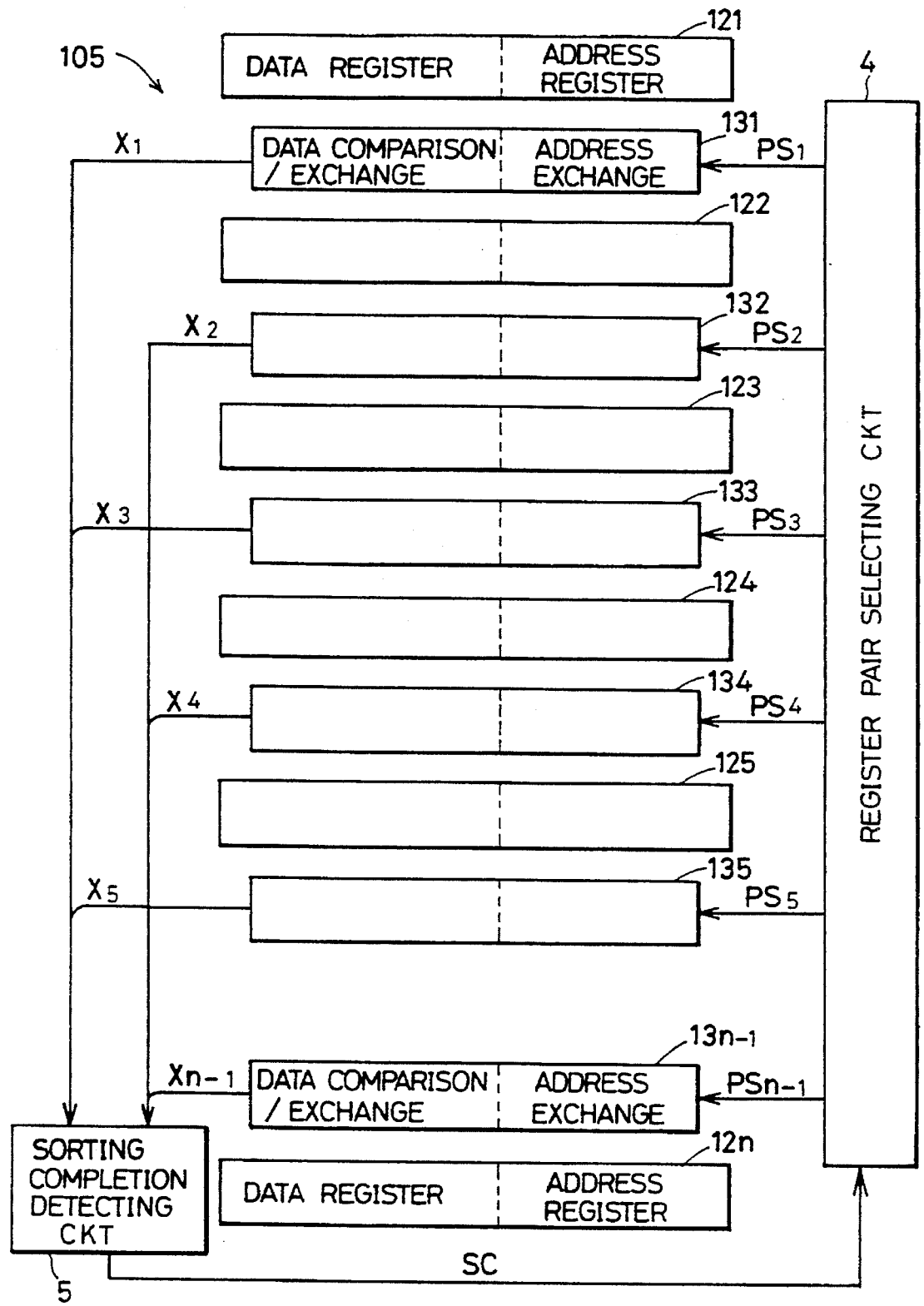
FIG. 11 is a block diagram of a sorting circuit for use in still another embodiment of the present invention.

A sorting circuit showing a still further embodiment of the present invention is shown in a block diagram of FIG. 11. In the sorting apparatus of FIG. 1, the maximum number of sortable data is limited to n. That is, since the sorting apparatus of FIG. 1 includes n data registers 21–2n, data more than n in number cannot be sorted. In order to sort the data larger in number than n, additional data registers and additional comparison/exchange circuits are required. This means that the data larger in number than n cannot be sorted without any additional hardware or circuits. Use of the sorting circuit shown in FIG. 11 allows the data larger in number than n to be handled without the number of data registers and comparison/exchange circuits being limited.

With reference to FIG. 11, a sorting circuit 105 includes register circuits 121–12n each including a pair of data register and address register, exchange circuits 131 to 13n–1 each including a pair of data comparison/exchange circuit and address exchange circuit, and the like. The data registers and the data comparison/exchange circuits operate in the same manner as their corresponding circuits shown in FIG. 1. That is, the data comparison/exchange circuits respond to pair selection signals PS1 to PSn–1 applied from a register pair selecting circuit 4 to compare and exchange data between any data registers. In addition, a sorting completion detecting circuit 5 also operates in the same manner as circuit 5 shown in FIG. 1. Thus, sorting apparatus 105 shown in FIG. 11 also can complete the sorting of n or less data in a short time.

An address exchange circuit provided in each of exchange circuits 131–13n–1 responds to the result of data comparison by its corresponding data comparison/exchange circuit to exchange held addresses between adjacent two address registers. That is, when a corresponding data comparison/exchange circuit exchanges the held data between adjacent two registers, a corresponding address exchange circuit exchanges the held addresses between corresponding adjacent two address registers. In other words, even if the data and address held in a pair of data registers and address register is transmitted to another register circuit through the data comparison/exchange circuit and address exchange circuit, the pair of data and address is retained.

As aforementioned, the use of the sorting circuit shown in FIG. 11 allows the sorting of data larger in number than n. In order to realize the sorting of the data larger in number than n, a CPU 101 shown in FIG. 10 carries out processings shown in the flow charts of FIGS. 12 and 13 on the basis of a prepared program. In the processings shown in FIGS. 12 and 13, a sorting method called "merge sort" is utilized.

Figure 12:
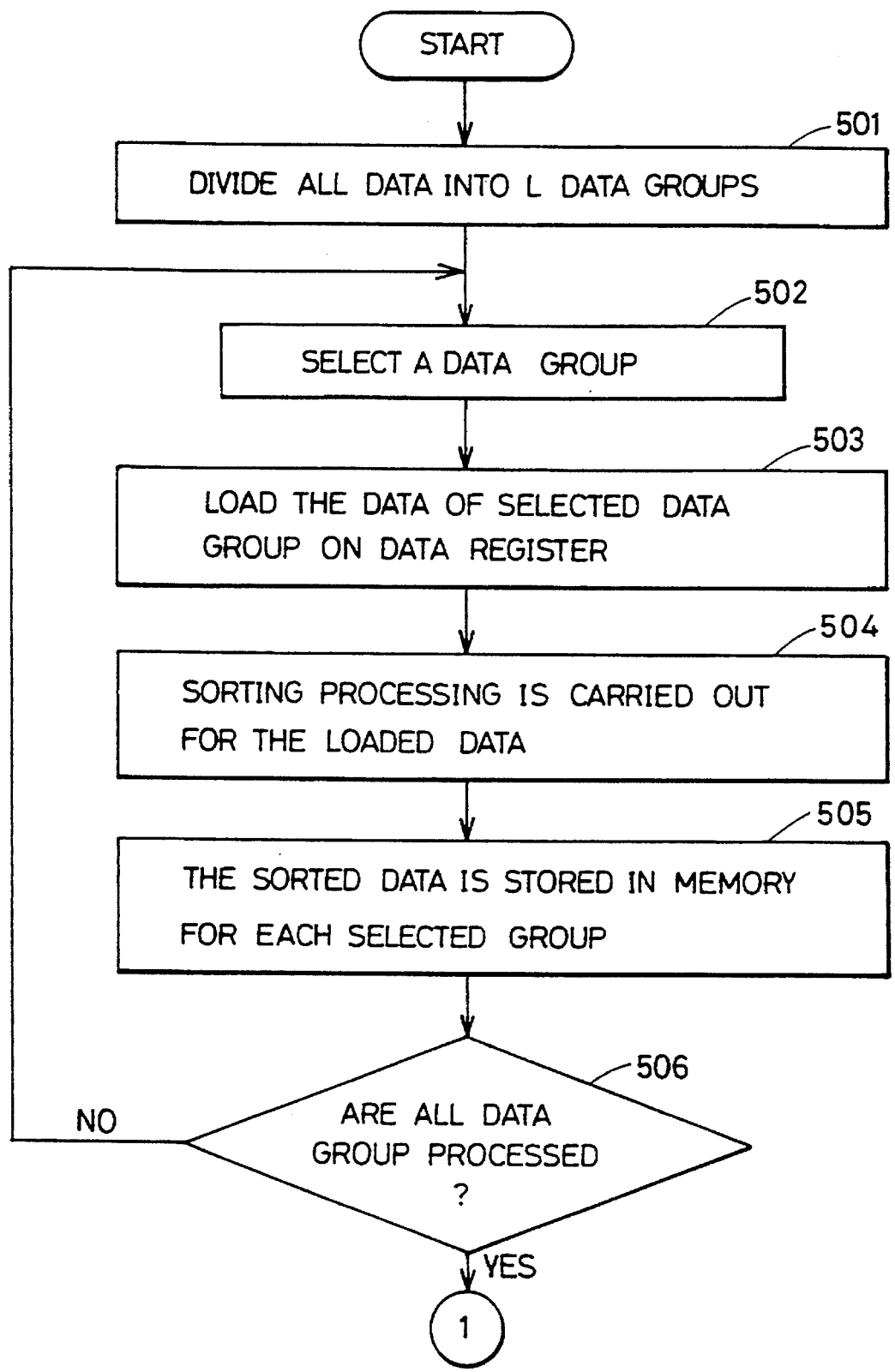
FIG. 12 is a flow chart showing a first-half processing in a sorting apparatus including the sorting circuit of FIG. 11.

Referring to FIG. 12, first, in step 501, all data to be sorted are divided into L data groups. Each data group includes n data or less. Thus, the data included in each data group can be sorted in units of groups by employing sorting circuit 105 shown in FIG. 11.

In step 502, one data group to be sorted is selected from the divided L data groups. In step 503, data in the selected data group are loaded on the data registers shown in FIG. 11, respectively.

In step 504, sorting circuit 105 shown in FIG. 11 carries out a sorting processing with respect to the loaded data. Since the sorting processing in sorting circuit 105 is the same as that in the sorting apparatus shown in FIG. 1, a description thereof will not be repeated here. The sorted data are once stored in a memory 102 for each selected data group (step 505).

In step 506, a determination is made as to whether the processings in steps 501–505 are carried out with respect to all the data groups. If there is any data group left, the processing returns to step 502. L data groups each including sorted data are formed within memory 102 by repetition of the processings in steps 502–506.

Figure 13:
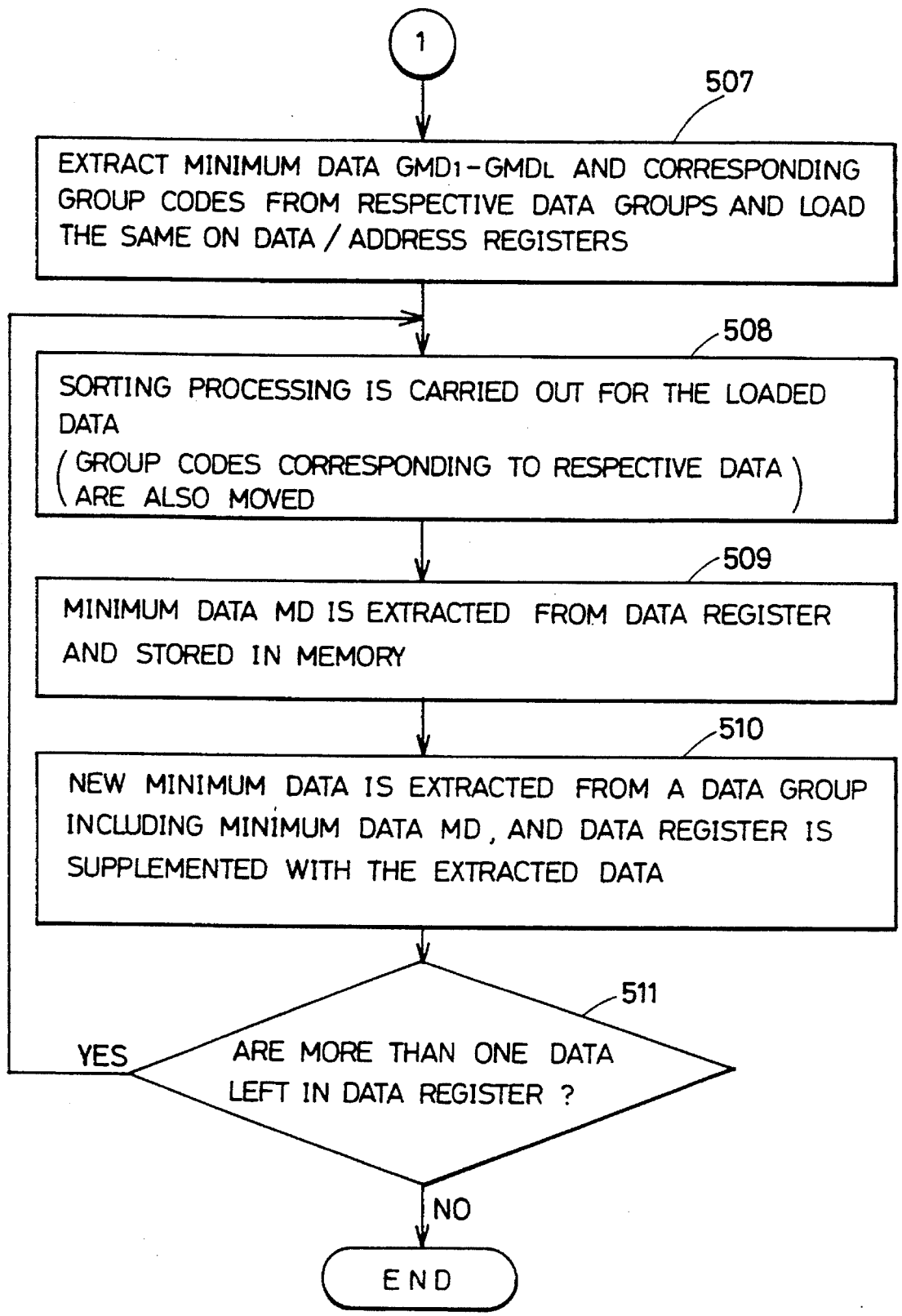
FIG. 13 is a flow chart showing a last-half processing succeeding to the processing of FIG. 12.

Referring to FIG. 13, in step 507, minimum data $GMD_1$–$GMD_L$ in each data group and a corresponding group code are extracted from each data group. Since sorting in each data group is already completed, each of minimum data $GMD_1$–$GMD_L$ can easily be obtained. Each group code indicates which data group one corresponding minimum data belongs to. Accordingly, each of minimum data $GMD_1$–$GMD_L$ and its corresponding group code are paired, and L pairs of minimum data and group codes are loaded respectively on L register circuits of register circuits 121–12n.

In step 508, sorting apparatus 105 carries out a sorting processing for the loaded data. By action of the data comparison/exchange circuits and address exchange circuits, pairs of data and group code move between register circuits 121–12n while maintaining the form of pairs. When the sorting is completed, minimum data MD of minimum data $GMD_1$–$GMD_L$ is obtained in a data register within register circuit 121.

In step 509, minimum data MD is extracted from the data register in register circuit 121, so that the extracted data is stored in memory 120. The group code of the data group, to which minimum data MD belongs, is held in the address register in register circuit 121.

In step 510, new minimum data which is second minimum to data MD is extracted from the data group including minimum data MD by reference to the group code held in the address register in register circuit 121. New minimum data is applied to the data register in register circuit 121. In other words, the data register in register circuit 121 is supplemented with such new minimum data.

In step 511, a determination is made as to whether more than one data are left in the data registers in register circuits 121–12n. When a plurality of data are left, the processing returns to step 508. Accordingly, sorting is carried out again including the supplemented data by sorting apparatus 105. After the sorting in step 508, the processings in steps 509 and 510 are carried out.

By repetition of the processings in steps 508–511, data are sequentially stored in ascending order from L data groups into memory 102. As a result, all the sorted data are obtained in the memory.

Figure 14:
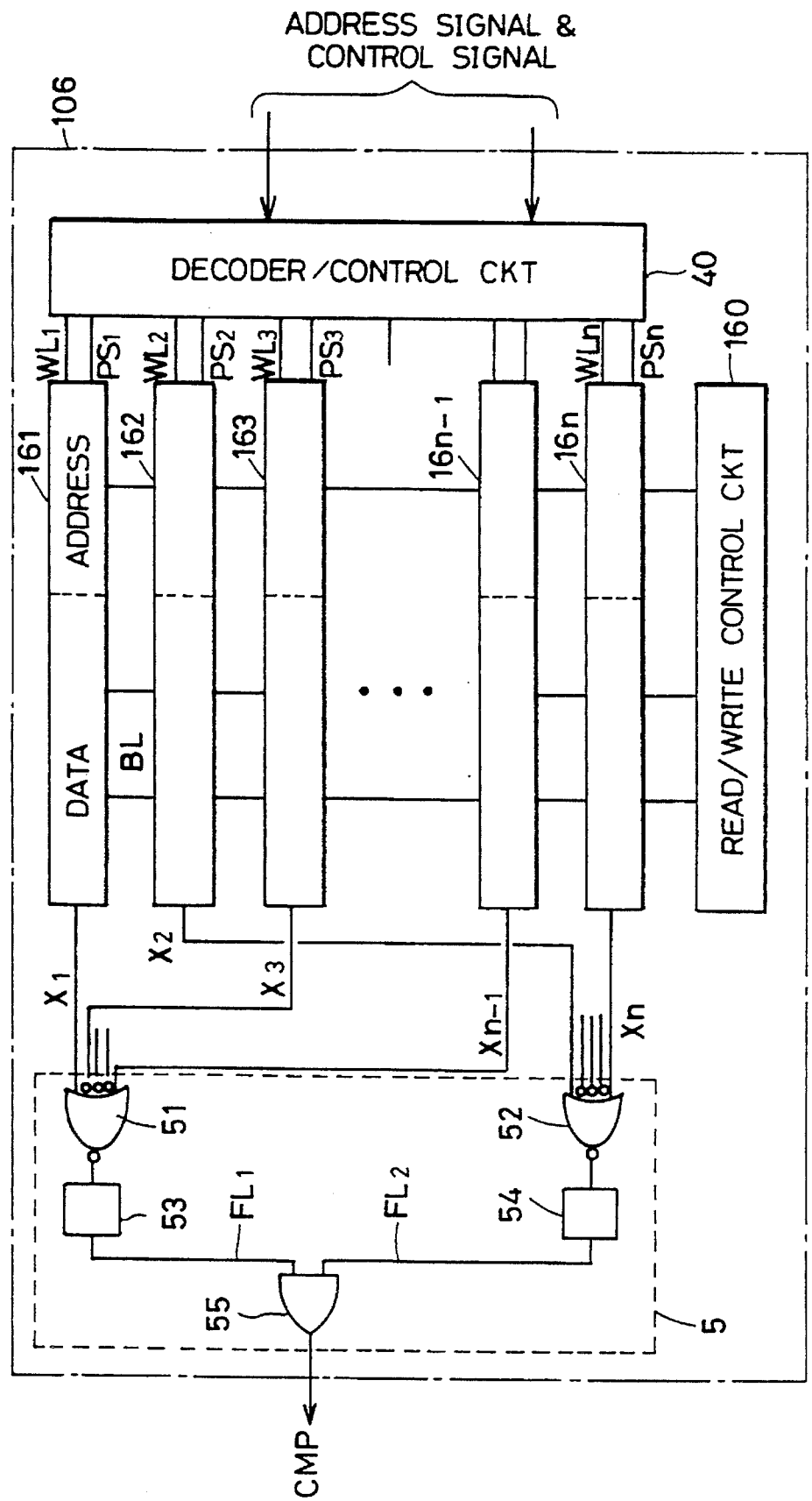
FIG. 14 is a block diagram of the sorting processor showing still another embodiment of the present invention.

FIG. 14 is a block diagram of a sorting processor showing a still further embodiment of the present invention. A sorting processor 106 shown in FIG. 14 operates basically in the same manner as sorting circuit 105 shown in FIG. 11. Sorting processor 106 is applicable in computer system 500 shown in FIG. 10.

Referring to FIG. 14, sorting processor 106 includes macro cells 161–16n each including a data circuit and an address circuit, and a read/write control circuit 160 for accessing to the data circuits and address circuits in macro cells 161–16n. Since the other circuit configurations are the same as those in sorting processor 103 shown in FIG. 4, a description thereof will not be repeated.

Respective data circuits in macro cells 161–16n correspond to macro cells 61–6n shown in FIG. 4, and hence, they compare and exchange adjacent two data. Respective address circuits in macro cells 161–16n respond to the result of data comparison to exchange addresses (group codes in this embodiment) between adjacent two address circuits.

Figure 15:
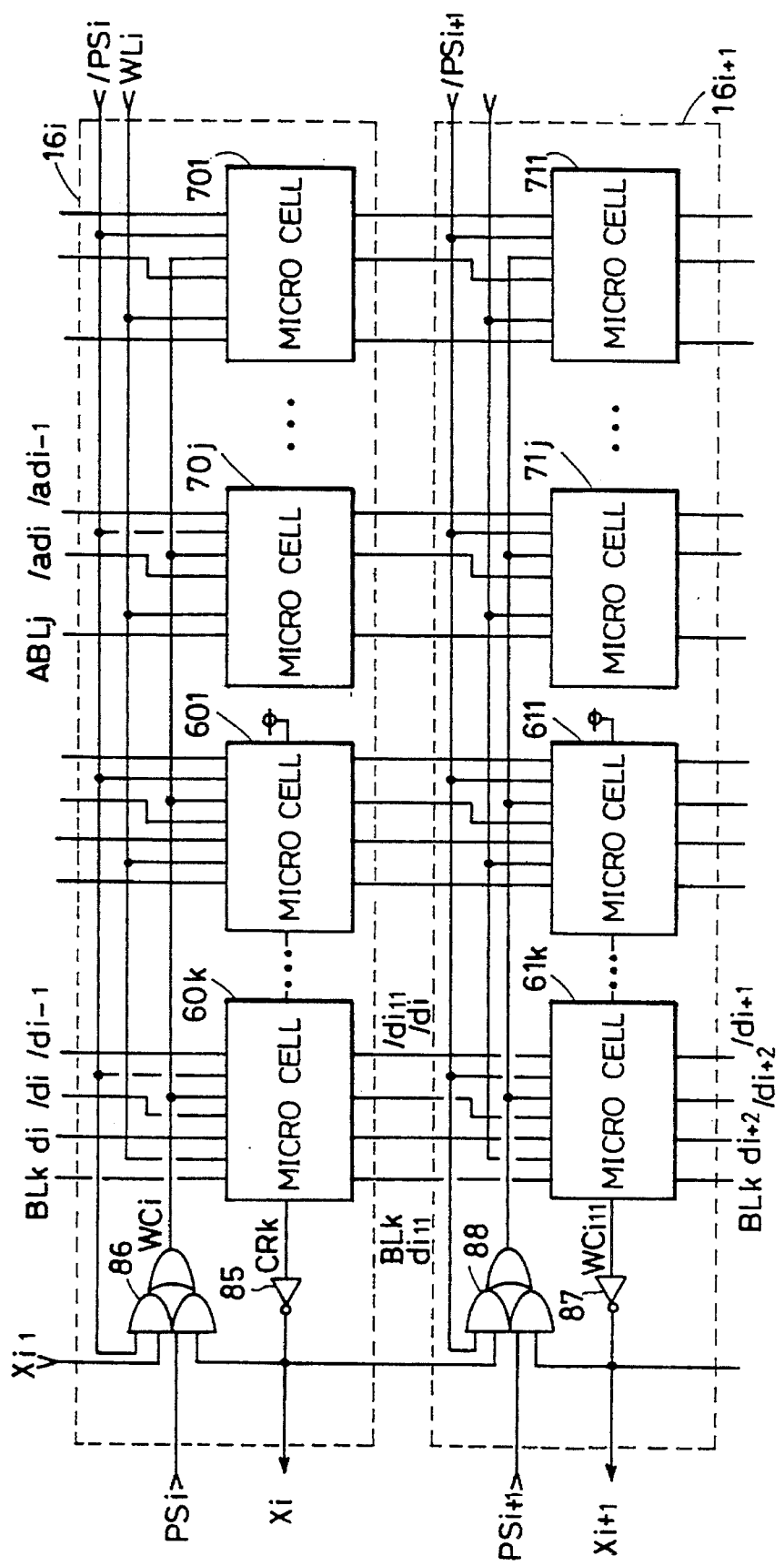
FIG. 15 is a circuit diagram of adjacent two macro cells shown in FIG. 14.

FIG. 15 is a circuit diagram of adjacent two macro cells shown in FIG. 14. An i-th macro cell 16i and an (i+1)-th macro cell 16i+1 are shown in FIG. 15. For example, i-th macro cell 16i includes micro cells 601–60k constituting the data circuit shown in FIG. 14 and micro cells 701–70j constituting the address circuit. A circuit configuration of each of micro cells 601–60k is the same as that of circuit 60k shown in FIG. 6, and hence, a description thereof will not be repeated here. A j-th micro cell 70j is implemented by a circuit shown in FIG. 16.

Figure 16:
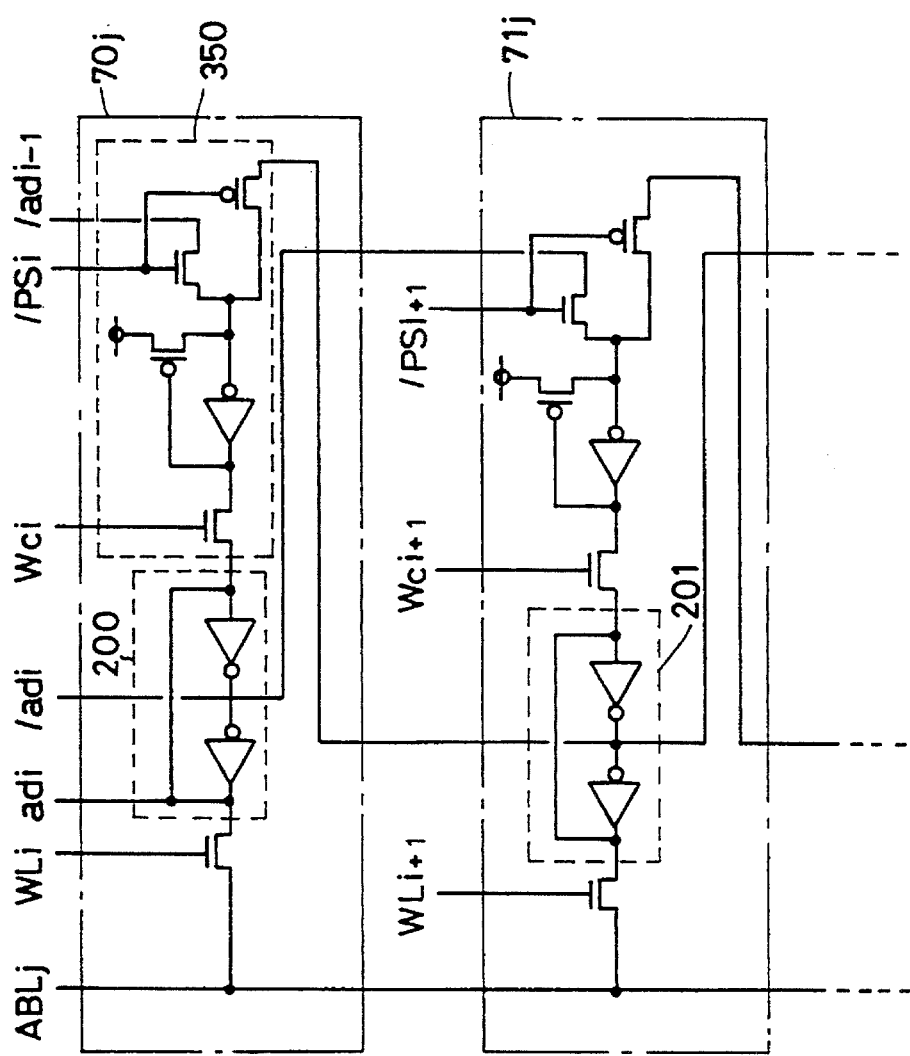
FIG. 16 is a circuit diagram of micro cells constituting an address circuit shown in FIG. 15.

Referring to FIG. 16, j-th micro cell 70j includes an address bit latch circuit 200 for latching one-bit address bit signals adi and/adi, and an exchange circuit 350 responsive to the result of data comparison for exchanging the latched address bit signals between latch circuit 200 and an adjacent address bit latch circuit. As compared to micro cell circuit 60k shown in FIG. 6, micro cell circuit 70j for addresses is obtained by removing comparison circuit 300 from micro cell circuit 60k for data.

When sorting processor 106 shown in FIG. 14 is employed also, processings are executed on the basis of the flow charts shown in FIGS. 12 and 13. In the following description, an explanation will be made as to how sorting processor 106 of FIG. 14 operates in step 508 shown in FIG. 13.

Minimum data in the respective data groups and corresponding group codes are applied through read/write control circuit 160 to the data circuits and address circuits in macro cells 161–16n, respectively. For example, latch circuit 200 within micro cell 70j of FIG. 16 latches address bit signals (corresponding to one bit of a group code) adi and/adi applied through an address bit line ABLj from read/write control circuit 160.

As the result of a comparison between adjacent two data, when data exchange is carried out, the latched address bit signals are exchanged between micro cells 70j and 71j shown in FIG. 16. This exchange operation is carried out in the same manner as the exchange between the data bit signals shown in FIG. 6. As a result, address bit signals latched in latch circuits 200 and 201 are exchanged between adjacent two micro cells 70j and 71j.

In micro cells 701–70j for addresses shown in FIG. 15, since an exchange with respect to addresses is made in response to the result of data comparison, addresses, i.e., group codes together with data to be sorted move between the address circuits shown in FIG. 14.

As described above, although the maximum number of data that can be handled in a single processing is limited to n in sorting circuit 105 of FIG. 11 or sorting processor 106 of FIG. 14, dividing data to be sorted allows sorting of a large number of data exceeding n. That is, as shown in FIG. 12, after all the data to be sorted are divided into L data groups (step 501), processings in other steps 502–511 shown in FIGS. 12 and 13 are carried out. Thus, the sorting of a large number of data exceeding n can be achieved.

In all of the foregoing embodiments, it is pointed out that a bit length of data to be sorted is limited. That is to say, a bit length of data that can be handled by sorting processor 103 shown in FIG. 4, for example, is limited to k bits as can be seen from the number of micro cells 601–60k shown in FIG. 5. In other words, in all of the foregoing embodiments, the bit length of data that can be handled is limited to k bits by hardware. If it is necessary to sort the data of higher than k bits, the sorting cannot be made by the foregoing hardware. Therefore, it is necessary to increase the number of micro cells dependently on the bit length of data to be sorted. In the following embodiment, an explanation will be made on a sorting apparatus and a sorting processor which can sort data having a bit length exceeding k bits.

Figure 17:
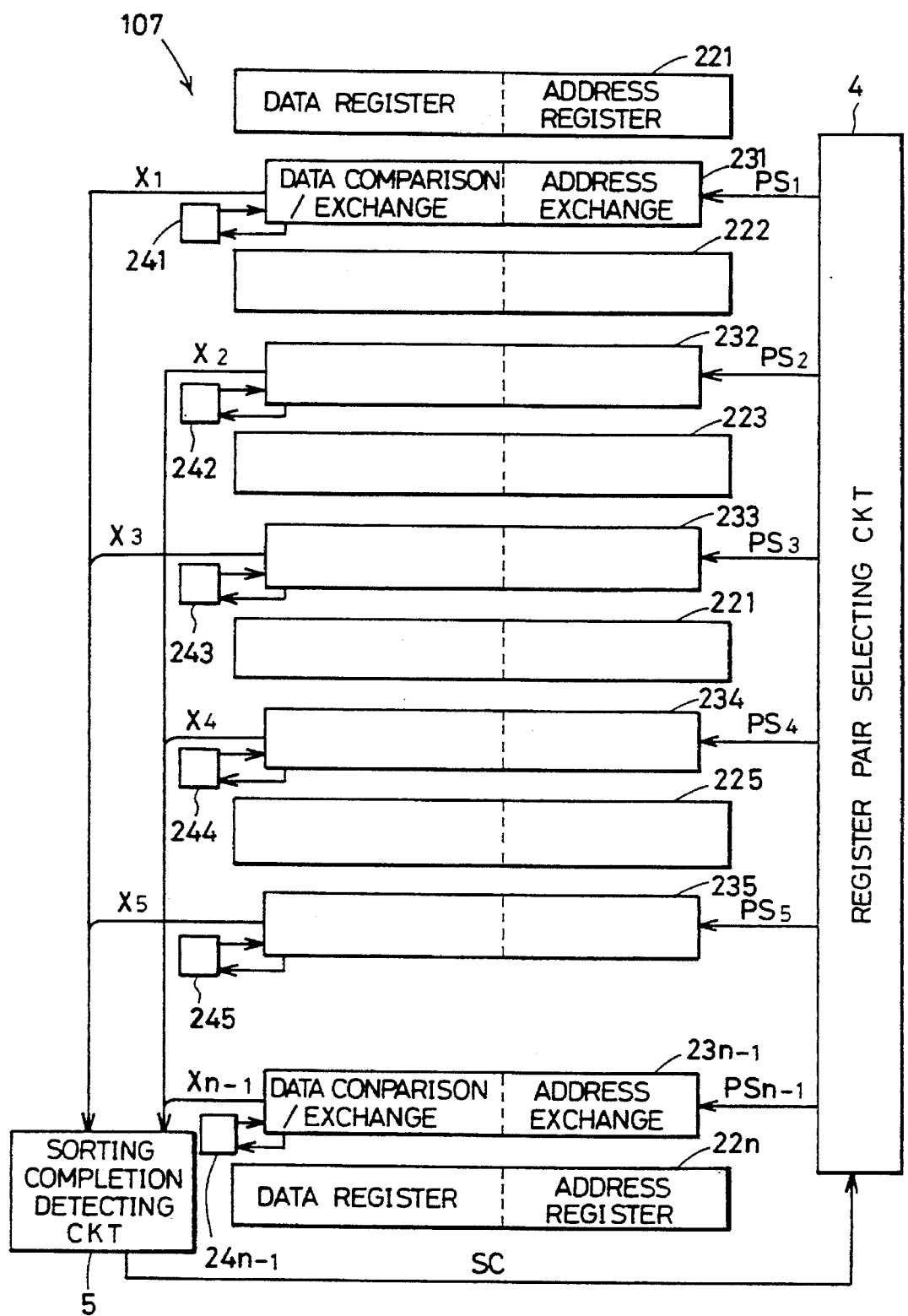
FIG. 17 is a block diagram of a sorting circuit employed in a still further embodiment of the present invention.

FIG. 17 is a block diagram of a sorting circuit employed in a still further embodiment of the present invention. Referring to FIG. 17, this sorting circuit 107 includes register circuits 221–22n each including a pair of data register circuit and address register circuit, exchange circuits 231 to 23n−1 for comparing and exchanging two held data and exchanging addresses between adjacent two register circuits, and match flag registers (hereinafter referred to as MF registers) 241 to 24n−1 for holding flags indicating data matches between any adjacent two data. Since a register pair selecting circuit 4 and a sorting completion detecting circuit 5 are identical to the corresponding circuits shown in FIG. 1, a description thereof will not be repeated here.

Figure 18:
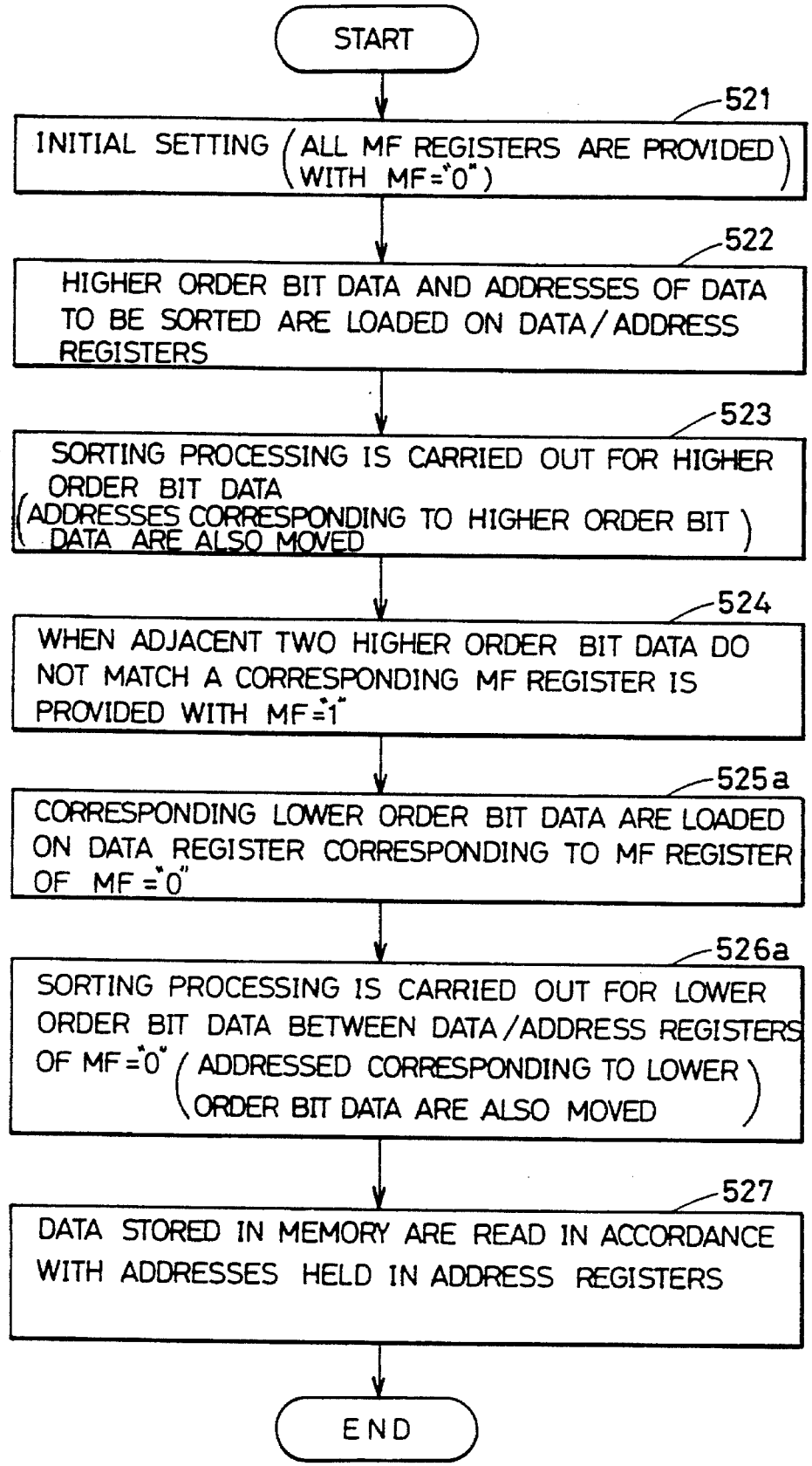
FIG. 18 is a flow chart showing a processing in a sorting apparatus including the sorting circuit of FIG. 17.

A description will now be made on a sorting processing employing sorting circuit 107 shown in FIG. 17 with reference to FIG. 18. First, an initial setting is carried out in step 521. Particularly, all MF registers 241 to 24n–1 are provided with a reset flag (MF="0"), so that MF registers 241 to 24n–1 are reset.

Assume that a bit length of data to be sorted is more than k bits in the following description. Accordingly, the data to be sorted is divided into higher order bit data and lower order bit data. A processing is thus carried out with respect to the divided higher order or lower order bit data.

In step 522, the higher order bit data of the data to be sorted and addresses corresponding to respective data are loaded on register circuits 221–22n shown in FIG. 17. In step 523, a sorting processing is carried out for the loaded higher order bit data. In sorting circuit 107 shown in FIG. 17 also, respective pairs of data and addresses move between register circuits 221–22n in the same manner as in sorting circuit 105 shown in FIG. 11.

After the sorting is completed, respective data comparison/exchange circuits in exchange circuits 231 to 23n–1 apply match flags MF to corresponding MF registers 241 to 24n–1. When adjacent two higher order bit data do not match each other, the data comparison/exchange circuits apply mismatch flags (MF="1") to the MF registers. When adjacent two higher order bit data match each other, the corresponding MF registers continue to hold the match flags (MF="0").

In step 525a, lower order bit data corresponding to the held higher order bit data are loaded on registers corresponding to the MF registers holding the match flags (MF="0"). That is, since a determination cannot be made as to how large two data are only by the comparison between higher order bit data, lower order bit data are loaded and a comparison with respect to the lower order bit data is made.

A sorting processing is carried out for the loaded lower order bit data in step 526a. Each data comparison/exchange circuit compares and exchanges data between adjacent two lower order bit data when a match flag (MF="0") is held in a corresponding MF register. On the other hand, the data comparison/exchange circuit does not compare and exchange data when a mismatch flag (MF="1") is held in the corresponding MF flag. In the sorting in step 526a also, pairs of data and addresses are moved in response to the result of the comparison between adjacent two data. As the result of sorting in steps 523 and 526a, addresses indicating the ascending order of data are held in turn in the address registers within register circuits 221–22n.

In step 527, data stored in memory 102 are sequentially read in accordance with the addresses held in the address registers within register circuits 221–22n. As a result, data sorted in ascending order are obtained from memory 102.

Figure 19:
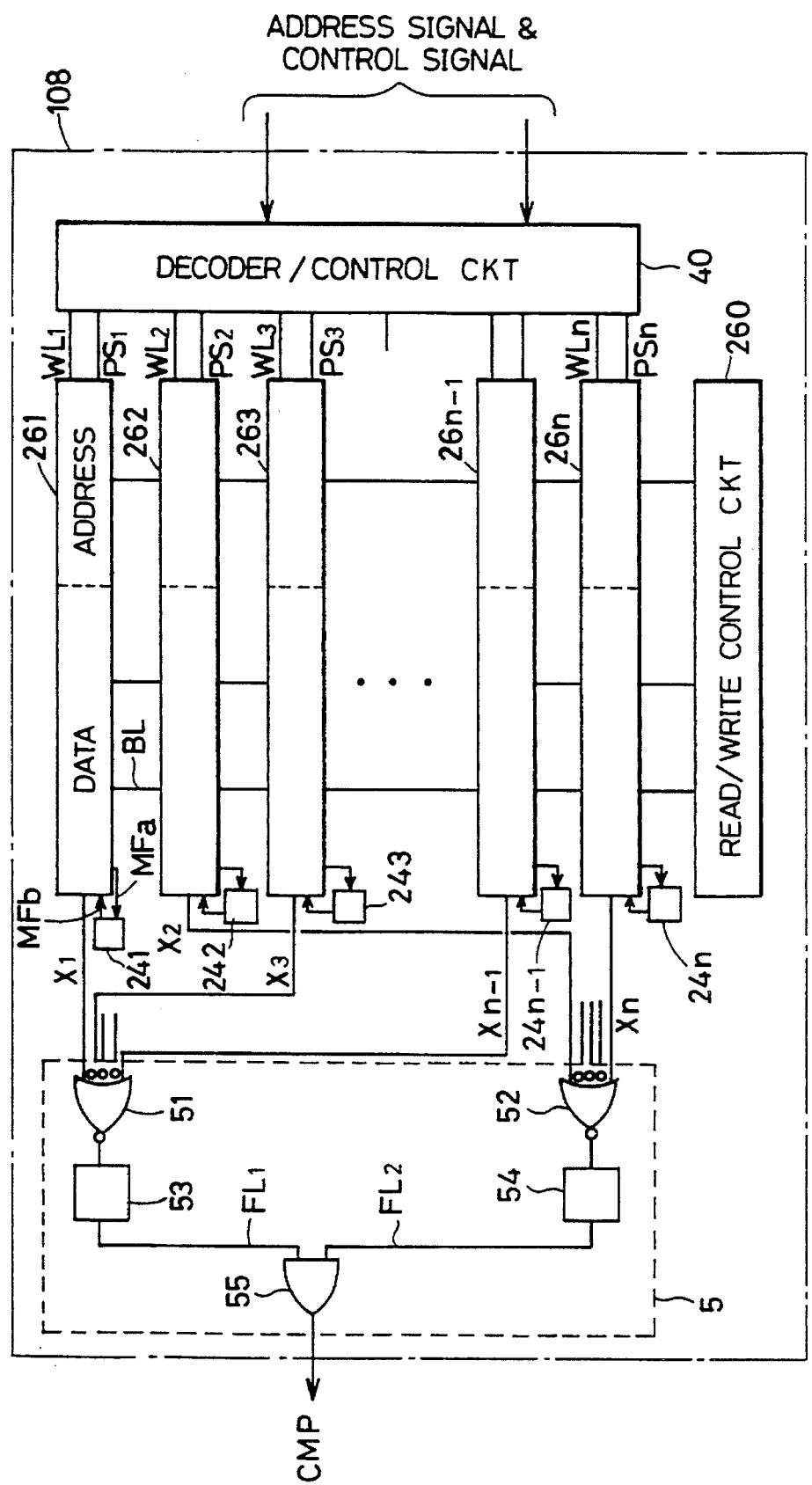
FIG. 19 is a block diagram of a sorting processor showing a still further embodiment of the present invention.

FIG. 19 is a block diagram of a sorting processor showing a still further embodiment of the present invention. Referring to FIG. 19, this sorting processor 108 includes macro cells 261–26n each including a data circuit and an address circuit, a read/write control circuit 260 for making access to the data circuits and address circuits, and match flag registers (MF registers) 241–24n for holding flags indicating adjacent two data match each other. Since the other circuit configurations are identical to those of sorting processor 103 shown in FIG. 4, a description thereof will not be repeated here.

Figure 20:
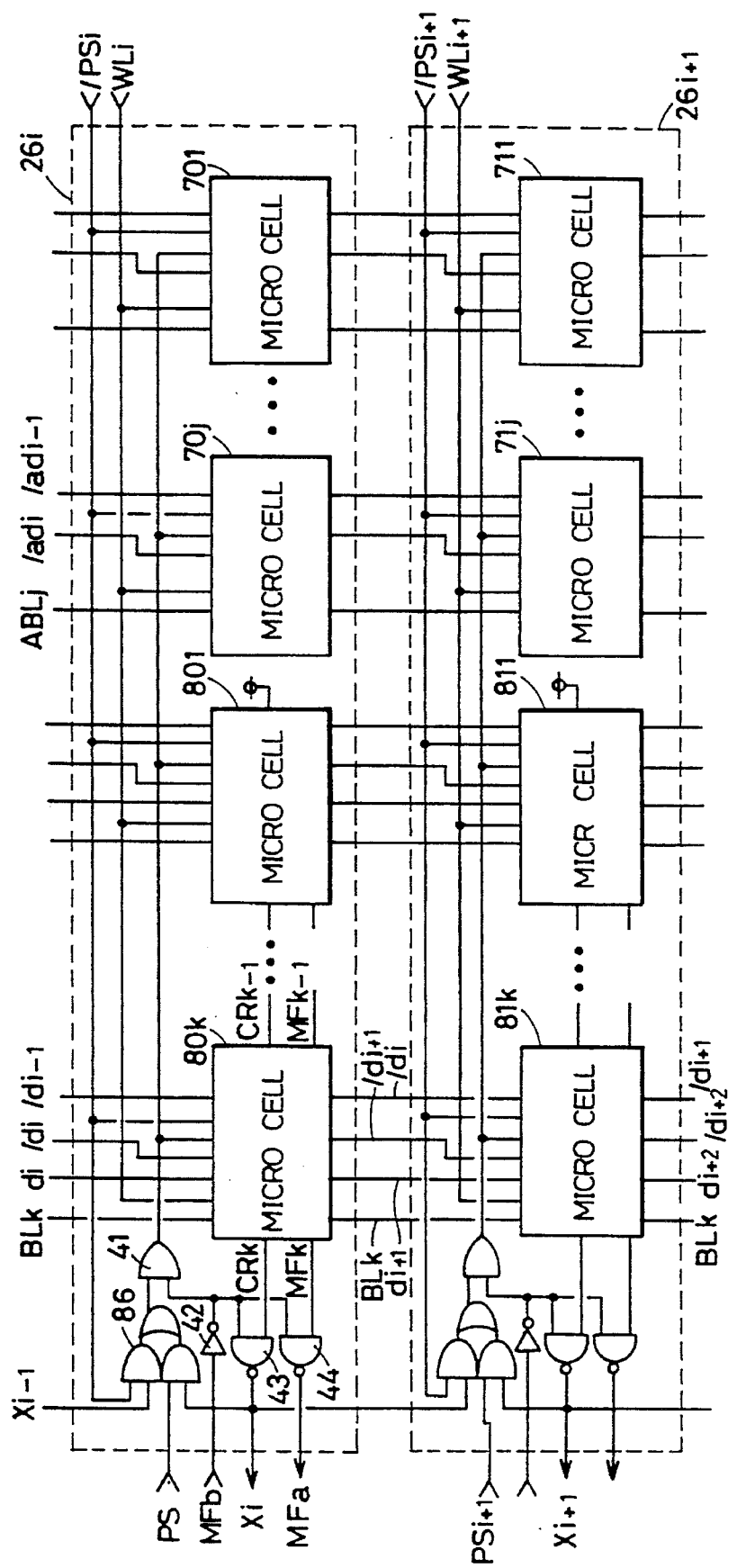
FIG. 20 is a circuit diagram of adjacent two macro cells of FIG. 19.

FIG. 20 is a circuit diagram of adjacent two macro cells 26i and 26i+1 shown in FIG. 19. Referring to FIG. 20, i-th macro cell 26i, for example, includes micro cells 801-80k constituting a data circuit for handling data to be sorted, micro cells 701–70j constituting an address circuit for handling an address corresponding to each data, a selector circuit 86, and the like. A NAND gate 44 outputs a match flag signal MFa indicating there is a match between adjacent two data. Signal MFa is applied to an MF register (not shown). A flag signal MFb held in the MF register is returned to an inverter 42. A NAND gate 43 outputs a signal Xi indicating there is data exchange in i-th macro cell 26i. When the data match is detected in macro cell 26i, i.e., the match between adjacent two data is detected, flag signals MFa and MFb indicate "0". On the other hand, when the match between adjacent two data is not detected, flag signals MFa and MFb indicate "1".

Read/write control circuit 260 shown in FIG. 19 applies data applied through a data bus 110 to data circuits in macro cells 261–26n, i.e., micro cells 801-80k. In addition, read/write control circuit 260 applies addresses applied through an address bus 130 to address circuits in macro cells 261–26n, i.e., micro cells 701–70j.

Figure 21:
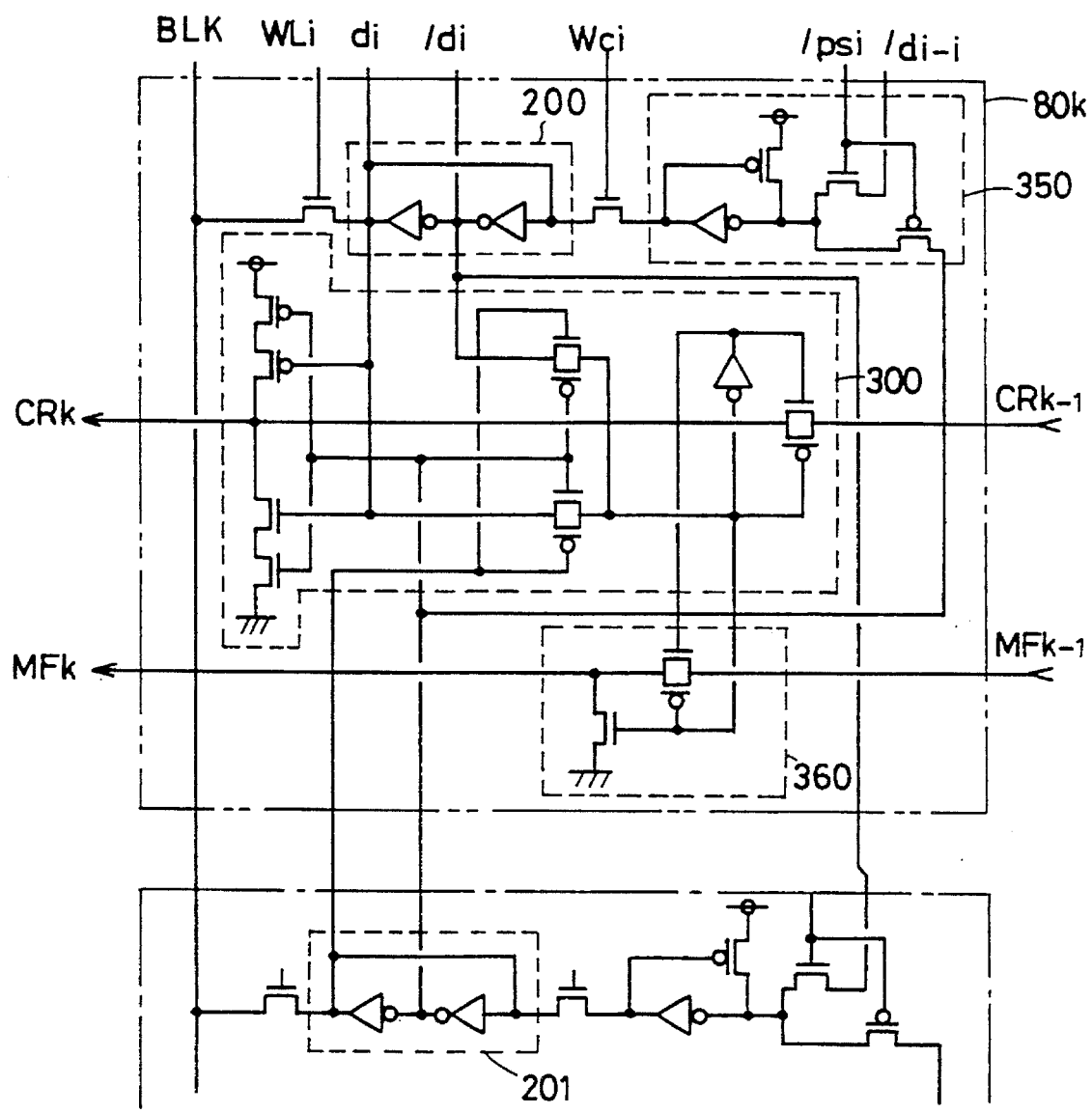
FIG. 21 is a circuit diagram of a single micro cell constituting an address circuit of FIG. 20.

FIG. 21 is a circuit diagram of k-th macro cell 80k shown in FIG. 20. Any micro cells 801–80k shown in FIG. 20 are structured in the same manner as circuit 80k shown in FIG. 21. Referring to FIG. 21, this micro cell 80k further includes a match detecting circuit 360 for detecting a match between k-th bits of adjacent two data, as compared to micro cell 60k shown in FIG. 6. When a flag signal MFk–1 applied from a (k–1)th micro cell (not shown) is "1" and a match is detected between k-th bits of adjacent two data, match detecting circuit 360 outputs a flag signal MFk of "1". In the other cases, micro cell 80k outputs a flag signal MFk of "0".

Micro cells 701–70j shown in FIG. 20 are identical to those 701–70j shown in FIG. 15. That is, each of micro cells 701–70j shown in FIG. 20 has the same circuit configuration and operates in the same manner as circuit 70j shown in FIG. 16.

Figure 22:
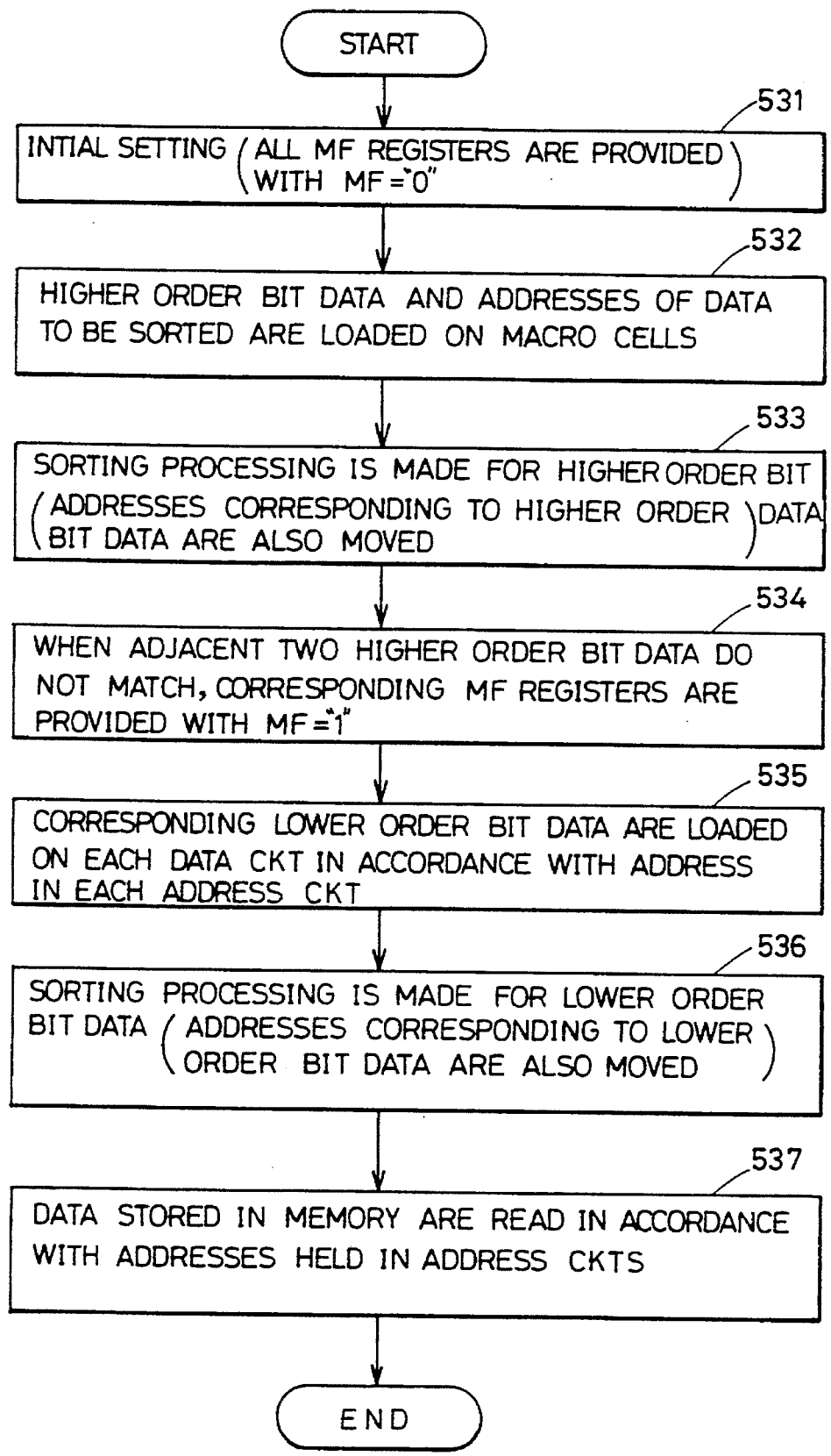
FIG. 22 is a flow chart showing a sorting processing employing the sorting processor of FIG. 19.

A description will now be made on a sorting processing in a computer system employing sorting processor 108 shown in FIG. 19, with reference to FIG. 22. Assume in the following description that the number of bits of data that can be processed in sorting processor 108 shown in FIG. 19 is 64 bits (k=64) and that the bit length of data to be sorted is 128 bits.

An initial setting is first carried out in step 531. That is, all MF registers 241–24n are provided with "0".

Next, in step 532, addresses corresponding to data of higher order 64 bits of data to be sorted are loaded on macro cells 261–26n via read/write control circuit 260.

In step 533, a sorting processing is carried out for the loaded higher order bit data. The data and addresses in pair move between the macro cells in accordance with the result of sorting.

After the sorting processing is completed, a processing in step 534 is carried out. When adjacent two higher order bit data do not match each other, a corresponding MF register is provided with "1".

In step 535, corresponding lower order bit data are loaded on corresponding data circuits in accordance with addresses held in the respective address circuits within macro cells 262–26n.

A sorting processing is carried out with respect to lower order bit data between macro cells corresponding to MF registers holding "0". In this embodiment, a sorting operation is disabled between macro cells corresponding to the MF registers holding "1". Thus, no sorting processing is carried out therebetween. The lower order bit data and address in pair are moved between the macro cells.

In step 537, the held addresses, i.e., the addresses moved by sorting are sequentially read from the address circuits in macro cells 261–26n. The sorted data, i.e., data of 128 bits arranged in ascending order are read from memory 102 in accordance with the read addresses.

As described above, even if the bit length of data that can be handled in sorting circuit 107 of FIG. 17 or sorting processor 108 of FIG. 19 is limited, it becomes possible to sort data having a bit length longer than that bit length. In other words, it becomes possible to sort data having a longer bit length by addition of only software without any change in circuit configuration, i.e., hardware.

It is pointed out that the processing in the sorting apparatus shown in FIG. 1 is basically utilized in all of the foregoing embodiments. Accordingly, a sorting apparatus and a sorting processor can be obtained that can complete sorting in a short time without the number and/or the bit length of data to be sorted being limited.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sorting apparatus for sorting applied n data into a predetermined order, comprising:

n data holding means for holding said applied n data;

first pair selecting means for selecting a group of first pairs of the form (2m+1, 2m+2) m=0, 1, 2, ... j−1, each pair including predetermined adjacent two data holding means of said n data holding means;

first comparison means responsive to said first pair selecting means for comparing two data held within the paired two data holding means for each pair selected by said first pair selecting means, said first comparison means including j first comparison circuits each connected between the two data holding means paired by said first pair selecting means, for comparing the two data held within said paired two data holding means;

first data exchange means responsive to said first comparison means for exchanging the held data between the paired two data holding means for each pair selected by said first pair selecting means;

second pair selecting means for selecting a group of second pairs of the form (2m+2, 2m+3) m=0, 1, 2, ... k−1, each pair including predetermined other adjacent two data holding means of said n data holding means which are not selected by said first pair selecting means;

second comparison means responsive to said second pair selecting means for comparing two data held in the paired two data holding means for each pair selected by said second pair selecting means, said second comparison means including k second comparison circuits each connected between the two data holding means paired by said second pair selecting means, for comparing the two data held within said paired two data holding means;

second data exchange means responsive to said second comparison means for exchanging the held data between the paired two data holding means for each pair selected by said second pair selecting means; and sorting completion detection means responsive to output signals output form said j first comparison circuits and said k second comparison circuits for detecting completion of sorting of said applied n data;

said sorting completion detecting means including first match detecting means connected to outputs of said j first comparison circuits for detecting a match of the output signals output from said j first comparison circuits, second match detecting means connected to outputs of said k second comparison circuits for detecting a match of the output signals from said k second comparison circuits, and third match detecting means connected to receive output signals from said first and second match detecting means for detecting match of the output signals from said first and second match detecting means.

2. The sorting apparatus according to claim 1, wherein said first data exchange means responds to said first comparison means to exchange the held data between the paired two data holding means holding two data being not in said predetermined order; and said second data exchange means responds to said second comparison means to exchange the held data between the paired two data holding means holding two data being not in said predetermined order.

3. The sorting apparatus according to claim 2, wherein said sorting completion detecting means includes means responsive to said first and second comparison means for detecting that the n data held within said n data holding means are in said predetermined order.

4. The sorting apparatus according to claim 1, wherein said sorting completion detecting means further includes
first latch means connected to an output of said first match detecting means for latching an output signal output from said first match detecting means, and
second latch means connected to an output of said second match detecting means for latching an output signal output from said second match detecting means, wherein
said third match detecting means is connected to outputs of said first and second latch means to detect a match of the signals latched within said first and second latch means.

5. The sorting apparatus according to claim 1, wherein said n data holding means include n data register circuits for holding said applied n data.

6. The sorting apparatus according to claim 1, wherein said predetermined order includes one of descending order and ascending order of said applied n data.

7. A sorting method for sorting n data held in n data holding means into a predetermined order, said method comprising the steps of:

selecting a group of first pairs of the form (2m+1, 2m+2) m=0, 1, 2, ... j−1, each pair including predetermined adjacent two data holding means of said n data holding means;

comparing two data held in the paired two data holding means for each pair selected in said first pair selecting step, to obtain a first comparison, said first comparison means including j first comparison circuits each connected between the two data holding means paired by said first pair selecting means, for comparing the two data held within said paired two data holding means;

exchanging the held data between the paired two data holding means for each pair selected in said first pair selecting step, in response to said first comparison result;

selecting a group of second pairs of the form (2m+2, 2m+3) m=0, 1, 2, ... k−1, each pair including predetermined other adjacent two data holding means of said n data holding means which are not selected in said first pair selecting step;

comparing two data held in the paired two data holding means for each pair selected in said second pair selecting step, said second comparison means including
k second comparison circuits each connected between the two data holding means paired by said second pair selecting means, for comparing the two data held within said paired two data holding means;

exchanging the held data between the paired two data holding means for each pair selected in said second pair selecting step; and detecting completion of sorting of said applied n data in responsive to said first and second comparison result,
said step of detecting completion including
detecting a match of the output signals output from said first comparison result,
detecting a match of the output signals from said second comparison result, and
detecting a match in response to the result of the first and second detecting a match steps.

8. A sorting apparatus, comprising:

sorting means for sorting applied n data into a predetermined order and including
n data holding means for holding said applied n data,
first pair selecting means for selecting a group of first pairs of the form (2m+1, 2m+2) m=0, 1, 2, ... j−1, each pair including predetermined adjacent two data holding means of said n data holding means, first comparison means responsive to said first pair selecting means for comparing two data held within the paired two data holding means for each pair selected by said first pair selecting means, first data exchange means responsive to said first comparison means for exchanging the held data between the paired two data holding means for each pair selected by said first pair selecting means, second pair selecting means for selecting a group of second pairs of the form (2m+2, 2m+3) m=0, 1, 2, ... k−1, each pair including predetermined other adjacent two data holding means of said n data holding means which are not selected by said first pair selecting means, second comparison means responsive to said second pair selecting means for comparing two data held in the paired two data holding means for each pair selected by said second pair selecting means, second data exchange means responsive to said second comparison means for exchanging the held data between the paired two data holding means for each pair selected by said second pair selecting means, and sorting completion detection means responsive to said first and second comparison means for detecting completion of sorting of said applied n data;

data dividing means for dividing all data to be sorted into L data groups, each group having said n data or less;

data applying means for applying the data divided by said dividing means to said sorting means in units of data groups, said sorting means sorting the applied data in units of data groups with respect to said L data groups;

data extracting means for extracting optimum data in said predetermined order from each of said L data groups sorted by said sorting means; and optimum data determining means for determining optimum data in said predetermined order from the data extracted by said data extracting means.

9. The sorting apparatus according to claim 8, wherein said optimum data determining means includes, second data applying means for applying the data extracted by said first data extracting means to said data holding means within said sorting means, said sorting means sorting said extracted data in said predetermined order, and second data extracting means for extracting optimum data in said predetermined order from the data sorted by said sorting means.

10. The sorting apparatus according to claim 9, wherein said optimum data determining means further includes, supplementing means for newly extracting optimum data in said predetermined order subsequently to the data extracted by said second data extracting means from a data group which said extracted data belongs to, and supplementing the data holding means in said sorting means with the newly extracted data, and repeating means for repeating processings conducted by said sorting means, said second data extracting means and said supplementing means.

11. The sorting apparatus according to claim 10, wherein said second data applying means applies the data extracted by said first data extracting means to the data holding means in said sorting means, said second data extracting means extracts optimum data in said predetermined order from one of said n data holding means, and said supplementing means newly extracts optimum data in said predetermined order subsequently to the data extracted by said second data extracting means from the data group which said extracted data belongs to, and supplements said one of said n data holding means in said sorting means with the newly extracted data.

12. A sorting apparatus for sorting n data, each data including higher order bit data and lower order bit data, said apparatus comprising:

n data holding means for holding said n data;

sorting means for sorting applied data into a predetermined order;

higher order bit data applying means for applying the respective higher order bit data of said n data to said sorting means, said sorting means carrying out sorting with respect to applied n higher order bit data;

match data group detecting means for detecting a match data group including matching data from the higher order bit data processed by said sorting means;

lower order bit data applying means for applying lower order bit data corresponding to the higher order bit data within said match data group to said sorting means, said sorting means carrying out sorting with respect to the applied lower order bit data; and order determining means for determining the order of said n data in accordance with the result of processing conducted by said sorting means with respect to said higher order bit data and said lower order bit data, said sorting means including
- first pair selecting means for selecting a group of first pairs of the form $(2m+1, 2m+2)$ $m=0, 1, 2, \ldots j-1$, each pair including predetermined adjacent two data holding means of said n data holding means,
- first comparison means responsive to said first pair selecting means for comparing two data held within the paired two data holding means for each pair selected by said first pair selecting means, said first comparison means including j first comparison circuits each connected between the two data holding means paired by said first pair selecting means, for comparing the two data held within said paired two data holding means,
- first data exchange means responsive to said first comparison means for exchanging the held data between the paired two data holding means for each pair selected by said first pair selecting means,
- second pair selecting means for selecting a group of second pairs of the form $(2m+2, 2m+3)$ $m=0, 1, 2, \ldots k-1$, each pair including predetermined other adjacent two data holding means of said n data holding means which are not selected by said first pair selecting means,
- second comparison means responsive to said second pair selecting means for comparing two data held in the paired two data holding means for each pair selected by said second pair selecting means, said second comparison means including k second comparison circuits each connected between the two data holding means paired by said second pair selecting means, for comparing the two data held within said paired two data holding means,
- second data exchange means responsive to said second comparison means for exchanging the held data between the paired two data holding means for each pair selected by said second pair selecting means, and
- sorting completion detection means responsive to output signals output form said j first comparison circuits and said k second comparison circuits for detecting completion of sorting of said applied n data, said sorting completion detecting means including
- first match detecting means connected to outputs of said j first comparison circuits for detecting a match of the output signals output from said j first comparison circuits,
- second match detecting means connected to outputs of said k second comparison circuits for detecting a match of the output signals from said k second comparison circuits, and
- third match detecting means connected to receive output signals from said first and second match detecting means for detecting match of the output signals from said first and second match detecting means.

13. The sorting apparatus according to claim 12, wherein said sorting means further includes,
- n address holding means for holding addresses corresponding to said applied n data,
- first address exchange means responsive to said first comparison means for exchanging the held addresses between corresponding two address holding means of said n address holding means for each pair selected by said first pair selecting means, and
- second address exchange means responsive to said second comparison means for exchanging the held addresses between the corresponding two address holding means for each pair selected by said second pair selecting means; and
- said order determining means includes data sequentially providing means for sequentially providing said n data stored in said data storing means in accordance with the addresses held in said n address holding means in said sorting means.

\* \* \* \* \*